United States Patent
Tezuka et al.

(10) Patent No.: US 8,567,245 B2
(45) Date of Patent: Oct. 29, 2013

(54) VEHICLE SPEED DETECTION UNIT AND WHEEL ATTACHMENT UNIT

(75) Inventors: Naotoshi Tezuka, Tokyo (JP); Kouichi Kiyotaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 545 days.

(21) Appl. No.: 12/745,625

(22) PCT Filed: Dec. 4, 2008

(86) PCT No.: PCT/JP2008/072060
§ 371 (c)(1),
(2), (4) Date: Jun. 1, 2010

(87) PCT Pub. No.: WO2009/072566
PCT Pub. Date: Jun. 11, 2009

(65) Prior Publication Data
US 2010/0307240 A1    Dec. 9, 2010

(30) Foreign Application Priority Data

Dec. 7, 2007    (JP) ................................. 2007-317192
Jun. 16, 2008    (JP) ................................. 2008-156660

(51) Int. Cl.
*G01P 1/02*    (2006.01)
(52) U.S. Cl.
USPC ......................................................... 73/494
(58) Field of Classification Search
USPC ......................................................... 73/494
See application file for complete search history.

(56) References Cited

U.S. PATENT DOCUMENTS 5,588,721 A * 12/1996 Asano et al. .................. 303/163
5,887,526 A *  3/1999 Zahnd ........................... 101/486

(Continued)

FOREIGN PATENT DOCUMENTS

| EP | 1 729 093 A2 | 12/2006 |
| JP | 8-220117 | 8/1996 |
| JP | 8-220122 | 8/1996 |
| JP | 2006-78222 | 3/2006 |
| JP | 2006-208392 | 8/2006 |
| WO | WO 02/18869 A1 | 3/2002 |

OTHER PUBLICATIONS

POSLV "Position and Orientation System for Land Vehicles", applanix A Trimble Company, (http://www.applanix.com/products/index.php#land), (http://www.applanix.com/media/downloads/products/brochures/POS%20LV%20Brochure.pdf), 2009, 8 pages.

(Continued)

*Primary Examiner* — Hezron E Williams
*Assistant Examiner* — Mark A Shabman
(74) *Attorney, Agent, or Firm* — Oblon, Spivak, McClelland, Maier & Neustadt, L.L.P.

(57) ABSTRACT

It is an object, in a wheel attachment unit holding a rotary encoder externally attached to a wheel, to certainly acquire an encoder output signal obtained from a rotating shaft of a tire, by reducing an occurrence of a bending deformation or breakage of a unit component (e.g., shaft) occurred during a vehicle run and making the encoder function normally. A shaft, through which there is passed a cable for outputting a measurement result of the encoder whose rotating shaft is connected to the wheel, is arranged offset from the axle center by a predetermined amount and is held by a bracket attached to the vehicle, to be movable in the up and down direction. Alternatively, a holder for holding a stator of the encoder is attached to the body of the vehicle, by a rotary linkage mechanism to hold rotatably with five degrees of rotational freedom.

3 Claims, 19 Drawing Sheets

(56) References Cited

U.S. PATENT DOCUMENTS

| | | | |
|---|---|---|---|
| 6,126,177 A * | 10/2000 | Steinert | 280/5.5 |
| 6,375,359 B1 * | 4/2002 | Miyazaki | 384/448 |
| 6,566,864 B1 * | 5/2003 | Brown et al. | 324/207.2 |
| 6,894,484 B2 * | 5/2005 | Takizawa et al. | 324/174 |
| 7,208,943 B2 | 4/2007 | Godoy et al. | |
| 7,230,419 B2 * | 6/2007 | Godoy et al. | 324/207.25 |
| 7,370,853 B2 * | 5/2008 | Urquidi et al. | 267/140.15 |
| 2002/0030482 A1 * | 3/2002 | Iwamoto et al. | 324/174 |
| 2003/0019323 A1 | 1/2003 | Babin et al. | |
| 2005/0188557 A1 * | 9/2005 | Raab et al. | 33/503 |
| 2006/0213288 A1 * | 9/2006 | Suzuki | 73/862.321 |
| 2006/0274485 A1 * | 12/2006 | Godoy et al. | 361/622 |
| 2008/0109108 A1 * | 5/2008 | Lawson | 700/213 |
| 2009/0114460 A1 * | 5/2009 | Amino et al. | 180/8.3 |

OTHER PUBLICATIONS

Extended European Search Report issued Apr. 26, 2012, in Patent Application No. 08857128.6.

M. Zywiel, "Aided Inertial Technology: Positioning for the Future", Traffic Technology International, http://www.applanix.com/media/downloads/articles_papers/POSLV_2003_01_AidedInertial-Technology.pdf, XP 2673726, Jan. 31, 2003, pp. 1-3.

Office Action issued Jan. 21, 2013, in European Patent Application No. 08 857 128.6.

Office Action dated Jun. 26, 2013, in European Patent Application No. 08857128.6.

Canadian Office Action issued May 24, 2013 in Canadian Application No. 2,707,566.

* cited by examiner

VEHICLE SPEED DETECTION UNIT AND WHEEL ATTACHMENT UNIT

TECHNICAL FIELD

The present invention relates to a vehicle speed detection unit mounted on a vehicle in order to detect a vehicle speed.

BACKGROUND ART

Vehicle position measuring can be performed by using a GPS (Global Positioning System), such as a car navigation system. That is, vehicle position measuring can be performed by a navigation positioning operation using a navigation positioning signal received from a GPS satellite.

In order to perform highly precise positioning even in the environment where it is difficult to receive a GPS radio wave, such as inside a feature blocking the sky or a tunnel, there is developed a GPS-INS integrated positioning which aims at improving accuracy of self-location by equipping a vehicle with sensors, e.g., a vehicle speed sensor, an inertial measuring unit (IMU), etc., to integrate a result of dead reckoning (dead-reckoning navigation) based on these sensors with a GPS so as to perform position measurement (refer to, for example, Patent Literature 1).

In order to obtain a highly precise positioning result in the GPS-INS integrated positioning, it is necessary to measure a speed and a travel distance of a vehicle, with sufficient accuracy. Odometry is used as a means for measuring speed and travel distance. Odometry measures a speed, a travel distance, etc. of a vehicle by detecting a vehicle speed pulse from a pulse signal generated from the rotary encoder attached to the wheel and in accordance with rotation of the wheel, and by integrating the vehicle speed pulses.

As this type of odometry, there is known the one configured by a vehicle speed detection unit in which a rotary encoder is externally attached to the wheel and by a signal processing unit. In the conventional vehicle speed detection unit, the rotor of the rotary encoder is connected to the axle hub of the wheel, and the stator of the rotary encoder is fixed to one end of the hollow shaft. The other end of the shaft penetrates the hole of a holed holding unit, which is protruded to the vehicle outer surface, to be held movably up and down. An output signal of the rotary encoder is transmitted into the vehicle through a signal cable passing in the shaft, and a vehicle speed pulse is processed by the signal processing unit arranged in the vehicle (refer to, for example, Nonpatent Literature 1).
[Patent Literature 1]
Japanese Unexamined Patent Publication No. 2006-208392
[Nonpatent Literature 1]
Product catalog of APPLANIX Corporation (Canada), "Position & Orientation System Land Vehicles" (http://www.applanix.com/products/index.php#land)

SUMMARY OF INVENTION

Technical Problem

However, the shaft of the conventional rotary encoder of the vehicle speed detection unit is held on the vehicle outer surface, from the wheel outside to the upper side of the fender provided in the periphery of the wheel house, and greatly protrudes from the vehicle outer surface, especially from the outermost surface of the over fender. Therefore, there is a problem that the shaft will be bent or broken because obstacles, such as a tree at the roadside and a protruding portion of a guardrail, may be caught in this shaft while the vehicle is running.

Moreover, when the vehicle body moves up and down with respect to the wheel during a run, the shaft slides up and down in the hole of the holed holding unit. At this time, bending or damage occurs in the shaft because unreasonable load may be applied to the shaft, or an abrasion caused by sliding or a running vibration may be generated between the shaft and the hole of the holding unit. Thus, there is a problem that the vehicle speed detection unit has low durability against a vehicle running on a wasteland or an irregular place and running for a long time, and it generates a noise.

If running is continued in the state of the shaft deformed or broken, since a large load is applied to the signal output cable, which is from the rotary encoder and is passing through the shaft, an operation failure or a disconnection will occur, thereby causing a deterioration of precision of vehicle position measuring.

It is an object of the present invention, for example, to certainly obtain a rotary encoder output signal acquired from rotation of the tire in order to obtain a highly accurate result of vehicle position measuring, by reducing a bending or breakage of a unit component (e.g., shaft) occurred during a vehicle run so as to maintain the rotary encoder attached to the vehicle to function normally.

Solution to Problem

A vehicle speed detection unit according to the present invention includes, for example,
a vehicle speed detecting part to be installed in a vehicle in order to measure a rotation angle of an axle of the vehicle,
a shaft, being tubular, through which an output cable for outputting a measurement result of the vehicle speed detecting part passes, and
a cover, attached to the vehicle, to cover and protect the shaft,
wherein one end of the shaft is connected to the vehicle speed detecting part, at a position offset in one of a vehicle forward direction and a vehicle backward direction from the axle by a predetermined amount, and other end of the shaft passes through a hole provided in the cover, to be held in an approximately perpendicular direction with respect to a road surface.

It has a feature that the one end of the shaft is connected to the vehicle speed detecting part through an elastic body.

It has a feature that the one end of the shaft is connected to the vehicle speed detecting part, at the position offset by the predetermined amount being one of less than and equal to a wheel radius of the vehicle.

It has a feature that the cover is attached to a tire housing part of the vehicle, is approximately an inverted trapezoid whose width of a bottom part is narrow and width of an upper part is wide, and covers the shaft with a part between the bottom part and the upper part.

It has a feature that the cover has the hole in the bottom part.

It has a feature that the hole is a circular hole, with a rounded edge, formed in a holding component fixed to the bottom part of the cover.

A vehicle speed detection unit according to the present invention includes, for example,
a rotary encoder having a rotating shaft fixed to an axle of a vehicle,
a shaft for holding the rotary encoder, at a position offset in a horizontal direction from the axle of the vehicle, and a cover, fixed to the vehicle, for holding the shaft to be slidable in an up-and-down direction.

It has a feature that the shaft is arranged between a wheel of the vehicle and the cover.

A wheel attachment unit according to the present invention includes, for example, a rotary encoder whose rotating shaft is connected to a wheel of a vehicle, and a rotary linkage mechanism, attached to a body of the vehicle, for rotatably holding the rotary encoder, with five degrees of rotational freedom.

It has a feature that the rotating shaft of the rotary encoder, which rotates with respect to a stator, is connected to the wheel of the vehicle, the wheel attachment unit further includes a holding tool for holding the stator of the rotary encoder, and a vehicle attachment to be attached and fixed, diagonally upward of an axle of the wheel, to a fender periphery of the body of the vehicle, wherein the rotary linkage mechanism includes a first link and a second link which are rotatably connected with having a first rotating joint, and includes a second rotating joint and a third rotating joint, holding the first link and the second link therebetween, for respectively connecting ends of the first link and the second link to the holding tool and the vehicle attachment, and wherein degree of rotational freedom of the first rotating joint, the second rotating joint, and the third rotating joint is totally five degrees of rotational freedom.

It has a feature that the wheel attachment unit further includes, an attachment hub for connecting the rotating shaft of the rotary encoder to the wheel of the vehicle, a holding tool for holding a stator of the rotary encoder, and a vehicle attachment attachable to the body of the vehicle, wherein the rotary linkage mechanism includes a first link, rotatably connected to the holding tool, to rotate about an axis of a second rotating joint which intersects perpendicularly to a longitudinal direction of the first link and the rotating shaft of the rotary encoder and has one degree of rotational freedom, and a second link, whose one end is rotatably connected to the first link, to rotate about an axis of a first rotating joint intersecting perpendicularly to the longitudinal direction of the first link and an axis of a second rotating joint and having one degree of rotational freedom, and whose other end is rotatably connected to the vehicle attachment, around a third rotating joint having three degrees of rotational freedom, wherein the third rotating joint is arranged offset in one of a forward direction and a backward direction of the vehicle, with respect to the rotating shaft of the rotary encoder, and the first rotating joint is arranged lower than a line connecting the rotating shaft of the rotary encoder and the third rotating joint.

It has a feature that the wheel attachment unit further includes, an attachment hub for connecting the rotating shaft of the rotary encoder to the wheel of the vehicle, a holding tool attached to a stator of the rotary encoder, and a vehicle attachment attachable to the body of the vehicle, wherein the rotary linkage mechanism includes a first link including a second rotating joint which intersects perpendicularly to the rotating shaft of the rotary encoder and has two degrees of rotational freedom, and being rotatably held to the holding tool, around the second rotating joint, and a second link whose one end is rotatably connected to the first link, to rotate about an axis of a first rotating joint intersecting perpendicularly to a longitudinal direction of the second link and a longitudinal direction of the first link and having one degree of rotational freedom, and whose other end is rotatably connected to the vehicle attachment, around a third rotating joint having two degrees of rotational freedom, wherein the third rotating joint is arranged offset in one of a forward direction and a backward direction of the vehicle, with respect to the rotating shaft of the rotary encoder, and the first rotating joint is arranged lower than a line connecting the rotating shaft of the rotary encoder and the third rotating joint.

It has a feature that the vehicle attachment includes an attaching stationary plate hanging down from a lower part of an over fender of the vehicle, and attached to the fender periphery of the vehicle, diagonally upward of the axle of the wheel, a cover attached to the attaching stationary plate, to cover the attaching stationary plate and the second link, and a guide protrudingly provided between the cover and the attaching stationary plate, to have a space against the attaching stationary plate, and contactlessly enclosing a part of the second link, with the attaching stationary plate.

It has a feature that the first link has a space for storing a signal output cable of the rotary encoder.

Advantageous Effects of Invention

According to the present invention, it is possible to prevent the shaft of the vehicle speed detection unit from being accidentally bent or broken and obtain an accurate vehicle speed measurement result output from the vehicle speed detection unit, thereby acquiring a stable and highly precise positioning result.

DESCRIPTION OF EMBODIMENTS

Embodiment 1

Embodiment 1 of the present invention will be described with reference to figures.

FIG. 1 depicts a state in which a vehicle speed detection unit 1 (wheel attachment unit) according to Embodiment 1 is mounted on a vehicle 50.

The vehicle speed detection unit 1 includes a vehicle speed detecting part 2 (encoder holding unit), a shaft 3, and a bracket 4 (cover unit, vehicle attachment). The vehicle speed detecting part 2, in which a rotary encoder is installed, is attached to the axle of the vehicle 50, and detects a rotation angle of a wheel 10. The shaft 3, being a hollow tube, in which an output cable of the vehicle speed detecting part 2 passes, slides (moves) up and down and rotates in the bracket 4, in accordance with a relative displacement of the position of the wheel 10 with respect to the vehicle body during a run. The bracket 4 attached to the vehicle, in which the output cable is clamped, covers the shaft 3 to protect it from obstacles outside the vehicle. This bracket 4 is fixed to a part of the vehicle body, such as a tire housing (wheel housing), with a screw etc. The shaft 3 is, for example, a hollow cylindrical shape, and alternatively it may be a hollow quadrangular shape.

FIG. 2 shows a detailed configuration diagram of the vehicle speed detection unit 1. (*a*) of FIG. 2 is a front view of the vehicle speed detection unit 1 when seeing the vehicle from a lateral direction, (*b*) of FIG. 2 is a side view of the vehicle speed detection unit 1, and (*c*) of FIG. 2 is a transparent perspective view of the bracket 4. FIG. 3 is a cross sectional view of the periphery of a rotary encoder 21.

In (a) and (b) of FIG. 2, the vehicle speed detecting part 2 includes the rotary encoder 21 for converting a rotational amount of the wheel 10 of the vehicle into a pulse number. As shown in FIG. 3, a rotating shaft (rotor 211) of the rotary encoder 21 is fixed to a processed part (inner) 67 attached, with a wheel nut 61, to the rotating part (wheel 10) where driving force is transmitted, and rotates with the wheel 10. The main body of the rotary encoder 21 except for the rotor 211 is held among the processed part (inner) 67, a processed part (outer) 68 and its cover 69.

A bearing 22 (bearing) is provided between the processed part (inner) 67 and the processed part (outer) 68, and action is separated through the bearing 22. That is, vehicle body parts 24 (the wheel nut 61, the processed part (inner) 67, the rotating shaft (rotor 211) of the rotary encoder 21), which are shown in slanting lines (hatching) in FIG. 3, rotate with rotation of the wheel 10. The main body of the rotary encoder 21, and the processed part (outer) 68 stand still regardless of the rotation of the wheel 10. The processed part (outer) 68 is connected to the shaft 3 through an elastic body 27 as will be stated later. Moreover, when the vehicle is running, the shaft 3 always contacts a hole 47 of the bracket 4. This serves as a rotation stopper in the configuration to make the processed part (outer) 68, the cover 69, the rotary encoder 21, and the shaft 3 stand still without rotating with the wheel 10.

In addition, the rotary encoder 21 is an example of the vehicle speed detecting part 2.

The vehicle speed detection unit 1 may be attached to either one of the front wheel and the rear wheel, and in this Embodiment, it shall be attached to the rear wheel where a relative displacement between the vehicle body and the wheel 10 is comparatively small, so as to avoid the front wheel which is used for steering. Data of a rotational amount measured by the rotary encoder 21 is transmitted and output by a signal output cable 26 attached to the rotary encoder 21.

The shaft 3 is a tubular part whose central portion is hollow. The signal output cable 26 from the rotary encoder 21 passes through this hollow of the shaft 3 to be drawn into the vehicle chamber.

As shown in FIG. 2, the shaft 3 is connected to the rotary encoder 21, at a position offset (shifted) from a rotating shaft 25 of the wheel by a predetermined amount in the forward and backward direction of the vehicle advancing direction through the elastic body 27 having a spring characteristic. Moreover, the shaft 3 is arranged inside the bracket 4, which will be explained later, not to contact with an external obstacle.

Since the length of the shaft 3 is related with a relative change amount between the vehicle body and the wheel 10 described below, it needs to be in the range of a predetermined length. At the same time, it is necessary to arrange the shaft 3 such that it may not extend to the outside of the vehicle as much as possible in order to avoid contacting an obstacle.

Then, as shown in (a) of FIG. 2, the shaft 3 is attached to the position offset from the rotating shaft (also called an axle) 25 of the wheel 10 by a predetermined amount in the backward direction of the vehicle, thereby holding the shaft 3 in the bracket 4 while keeping a predetermined length. This is because if the shaft 3 is arranged to pass the rotating shaft 25 of the wheel like the conventional case (for example, when the shaft 3 is arranged at the position 3b shown in FIG. 2), the distance between the lower end of the shaft 3 and the upper end of the bracket 4 is too short to retain a sufficient length for keeping the shaft 3 in the bracket 4. Although, in (a) of FIG. 2, the shaft 3 is attached at the position offset from the rotating shaft 25 of the wheel 10 by a predetermined amount in the backward direction of the vehicle, it is also preferable to attach it at the position offset by a predetermined amount in the forward direction of the vehicle. In this case, the shaft 3 is attached at the position offset from the rotating shaft (also called an axle) 25 of the wheel 10 by a predetermined amount less than or equal to a wheel radius in the backward direction of the vehicle.

The shaft 3 is connected to the vehicle speed detecting part 2 through the elastic body 27 having a spring characteristic as has been stated. If the vehicle speed detecting part 2 and the shaft 3 are connected firmly, there is concern that the bracket 4 described below may be damaged by a relative displacement of the vehicle body and the wheel 10 in the running direction or in the vehicle width direction. For this reason, the shaft 3 is connected to the vehicle speed detecting part 2 through the elastic body 27 having a spring characteristic in this Embodiment. This elastic body 27 may be made of, for example, a thin board having a spring characteristic, or a spring-shaped member. Alternatively, it may be made of a member having elasticity like rubber. At all events, there is provided a structure in which damage to the bracket 4 or to the shaft 3 described below is prevented by providing an area, between the shaft 3 and the vehicle speed detecting part 2, to let the force go. In addition, the cross-sectional shape of the shaft 3 is not limited to the circular one stated above, and it may be a square or a polygon as long as the signal output cable 26 passes through the hollow portion.

The bracket 4 is attached to the vehicle body side with a screw etc. as shown in (c) of FIG. 2. The bracket 4 is an inverted trapezoid whose bottom part width is narrow and upper part width is wide, and is a box shape whose top, bottom, left and right ends are bent to the side of the vehicle body to cover the outside of the shaft 3. The reason for using the bracket 4 in the shape of an inverted trapezoid is to prevent the axle from contacting the bracket 4 even when the vehicle body moves up and down, which will be described later.

Thus, there is provided a structure wherein since the bracket 4 covers the shaft 3, the shaft 3 is prevented from bending or being damaged caused by the shaft 3's catching an obstacle, etc. during a vehicle run.

Meanwhile, there is the hole 47 in a part of the bent board at the lower end of the bracket 4 as shown in (c) of FIG. 2. The shaft 3, connected to the vehicle speed detecting part 2 at the lower end, is configured to pass through the hole 47 and to be held movably in up and down directions with respect to the hole position. The hole 47 is located so that the shaft 3 may be approximately perpendicular to the road surface in order to follow the up and down motion of the vehicle body.

Thus, one end (lower end), being the side close to the road surface, of the shaft 3 is attached to the vehicle speed detecting part 2 through the elastic body 27, and the other end (upper end) passes through the hole 47 in the bracket 4 to be held approximately perpendicular to the road surface.

The signal output cable 26 of the rotary encoder 21 passes through the inside of the shaft 3 to be drawn into the vehicle while being banded in the bracket 4. The signal output cable 26 is arranged to keep a surplus length in the bracket 4 in order not to receive stress caused by the up and down motion of the shaft 3 in accordance with the vehicle running. The bracket 4 is an example of the cover.

Next, there will be explained the motion, during a vehicle run, of each structure part of the vehicle speed detection unit 1.

The purpose of the vehicle speed detection unit 1 is to make the rotary encoder 21, being a key part, operate normally, and to wire-transmit a pulse signal acquired from the rotating shaft of the wheel 10 to a recording unit used for positioning processing. However, since the vehicle and the wheel 10 are displaced vertically and horizontally during vehicle running, the shaft 3 needs to follow the motion of the vehicle.

FIG. 4 shows the motion of the shaft 3 during vehicle running. (a) of FIG. 4 shows a positional relation between the shaft 3 and the bracket 4 in an equilibrium state (neutral point) where the weight balance is maintained because the vehicle is stopped. (b) of FIG. 4 shows the shaft 3 and the bracket 4 in a state where the shock absorber (also just called an absorber) of the vehicle contracts to the maximum. (c) of FIG. 4 shows the shaft 3 and the bracket 4 in a state where the shock absorber extends to the longest. (d) of FIG. 4 shows a state where the wheel 10 is displaced backward because of running on a forward bump, etc. (e) of FIG. 4 shows a state where the wheel 10 is displaced forward because of running on a backward bump, etc.

As displacement between the vehicle body and the wheel 10 during vehicle running, there are displacement in the up and down direction, displacement in the running direction, and displacement in the vehicle width direction. Specifically, the displacement in the up and down direction is the case where the vehicle body floats because of extension of a not shown shock absorber ((c) of FIG. 4) and the case where the vehicle body sinks because of contraction of the shock absorber ((a) of FIG. 4). The displacement in the running direction is the case where the wheel 10 is displaced backward or forward with respect to the vehicle body at the time of running on a bump, etc. ((d) and (e) of FIG. 4). The displacement in the vehicle width direction is the case where the vehicle body and the wheel 10 are displaced in the direction of the vehicle width ((f) of FIG. 4).

In the vehicle speed detection unit 1 of the present Embodiment, it is configured that the upper end of the shaft 3 only passes through the hole 47 of the bracket 4 and is not fixed so that, with respect to up and down motion, a relative displacement between the vehicle body and the wheel 10 can be followed by the shaft 3's sliding up and down inside the bracket 4 (refer to (b) and (c) of FIG. 4). Moreover, it is configured, with respect to forward and backward motion in the running direction, a relative displacement between the vehicle body and the wheel 10 is followed by the shaft 3's performing rotational movement (refer to (d) and (e) of FIG. 4). Meanwhile, with respect to motion in the vehicle width direction, the elasticity of the elastic body 27 enables to follow the movement of the vehicle body (refer to (f) of FIG. 4).

FIG. 5 illustrates conditions of a dimension design of the shaft 3 and the bracket 4 relating to relative displacement between the vehicle body and the wheel 10. (a) of FIG. 5 shows a positional relationship between the shaft 3 and the bracket 4 in an empty car state (neutral point). (b) of FIG. 5 shows a state where the shock absorber of the vehicle contracts to the maximum because the wheel 10 moves in the direction to be covered with the vehicle body. (c) of FIG. 5 shows a state where the shock absorber extends to the maximum because the wheel 10 moves in the direction to be away from the vehicle body. (d) of FIG. 5 shows a state where the wheel 10 is displaced backward because of running on a forward bump, etc. (e) of FIG. 5 shows a state where the wheel 10 is displaced forward because of running on a backward bump, etc.

A maximum sinking amount of the vehicle body (maximum contraction of the vehicle shock absorber) is defined to be a[mm], and a maximum floating amount of the vehicle body (maximum extension of the vehicle shock absorber) is defined to be b[mm]. It is herein necessary to preliminarily design, defining the position of the wheel 10 in an equilibrium state as a neutral point with respect to the up and down direction, in order that there may be no mechanical interference, such as the shaft 3's contacting the bracket 4, even when the wheel 10 is displaced from the neutral point position by a vehicle maximum sinking amount a[mm] in the direction to be covered with the vehicle body ((b) of FIG. 5). It is also necessary to have a positional relationship such that the shaft 3 does not fall out from the hole 47 provided in the bracket 4 even when the wheel 10 is displaced from the neutral point position by a vehicle maximum floating amount b[mm] in the direction to be away from the vehicle body ((c) of FIG. 5). That is, at the neutral point position of (a) of FIG. 5, a space at least greater than or equal to a[mm] is secured in the space above the upper end of the shaft 3, and a length greater than or equal to b[mm] is secured as a length from the upper end of the shaft 3 to the hole 47 in the bracket 4. According to the present Embodiment, as has been explained above, since the shaft 3 is attached at the position offset from the axis passing the rotating shaft 25 of the wheel 10, it is possible to increase the degree of freedom of design as to the length of the shaft 3.

In addition, the space between the periphery of the hole 47 of the bracket 4 and the shaft 3 is a space in about the range wherein the shaft 3 can perform rotational movement (angle θ estimated from the displacement amount in the forward and backward direction of the wheel 10) when the wheel 10 is displaced in the forward and backward direction.

When viewed from the front, the bracket 4 is approximately an inverted trapezoid whose bottom width is narrow and upper part width is wide as shown in FIG. 5. The reason for the shape of the inverted trapezoid is to provide a relief in the bracket 4 so that the vehicle speed detecting part 2 may not contact the bracket 4 even in the state in which the vehicle speed detecting part 2 attached to the axle of the wheel 10 approaches the vehicle body because the vehicle body sinks during running. Meanwhile, in the range including the bottom of the bracket 4 of the inverted trapezoid, the bracket 4 can cover the shaft 3 in a large range by covering it with the portion between the bottom and the upper part of the bracket 4, thereby protecting the shaft 3 from an external obstacle, etc.

The bracket 4 is not limited to the shape of an inverted trapezoid, and it may be an inverted triangle or a polygonal shape as long as a relief can be provided in the bracket 4.

Thus, adopting the following technical ideas (a) to (d), the vehicle speed detection unit 1 of the present Embodiment is configured by combining the vehicle speed detecting part 2, the elastic body 27, the shaft 3, the bracket 4, and the hole at the lower part of the bracket 4 in a predetermined positional relationship as shown in FIGS. 1 and 2. Owing to this, since bending or breakage of the shaft 3 which occurs during a run is prevented, an accurate measurement result of a vehicle speed output from the vehicle speed detection unit 1 is obtained, thereby acquiring a stable and highly precise positioning result.

(a) The action of the vehicle part (the rotating shaft of the rotary encoder, etc.) which is connected to the wheel and rotates with it is separated, by a bearing, from the action of the part (the main body of the rotary encoder, etc.) which is not connected to the wheel and stands still.

(b) A shaft held approximately perpendicular to the road surface is provided in the part which is not connected to the wheel in order to stand still, and this shaft is covered with the bracket attached to the vehicle body side. Thereby, while protecting the shaft from an external obstacle, a wiring route is formed such that a vertical relative displacement between the vehicle body and the wheel, which is intrinsically possessed by the vehicle, may not be prevented.

(c) If the shaft 3 and the part which is not connected to the wheel and stands still are connected firmly, there is concern that the bracket may be damaged by a relative displacement in the running direction of the vehicle body and the wheel or in the vehicle width direction, so that they are just connected through an elastic body having a spring characteristic in order to provide a relief.

(d) The output cable of the rotary encoder passes through the hollow of the shaft to be drawn into the vehicle while being banded in the bracket. A surplus length of the cable is secured in the bracket 4 in order not to receive stress caused by up and down motion of the shaft.

Embodiment 2

In the vehicle speed detection unit 1 of Embodiment 1, abrasion will occur in both the shaft 3 and the bracket 4 by the contact, during a run, between the shaft 3 and the hole 47 provided in the bracket 4. If the abrasion proceeds, there is a possibility that the strength of the shaft 3 may fall, and the shaft 3 may be bent or broken. Then, in the vehicle speed detection unit 1 according to Embodiment 2, processing for preventing abrasion is applied to the hole part of the bracket 4 in which the shaft 3 passes. Structures which are the same as those of Embodiment 1 are given the same numbers, and explanation for them will be omitted.

(*a*) of FIG. 6 shows a sectional view of the vehicle speed detection unit 1 in the state where the shaft 3 passes through the hole 47 provided in the bracket 4, and (*b*) of FIG. 6 shows a front view of the vehicle speed detection unit 1. If the elastic body 27 connecting the shaft 3 and the vehicle speed detecting part 2 does not have rigidity capable of resisting the self-weight of the shaft 3, the shaft 3 inclines because of lack of rigidity. In the state where the shaft 3 has inclined, the hole periphery of the bracket 4 and the shaft 3 will be in a state of always contacting, and if the shaft 3 strokes up and down in this state, abrasion may occur at the shaft 3 and the hole 47. Thus, the shaft 3 will become thin, and breakage etc. will easily occur.

(*a*) of FIG. 7 shows a structure of the vehicle speed detection unit 1 according to Embodiment 2, and (*b*) of FIG. 7 is a cross sectional view at a-b of (*a*) of FIG. 7.

In the example of (*b*) of FIG. 7, the hole 45 is quadrangular, and the shaft 3 passes through this hole 45 to hold its position. The bracket 4 is usually made of a metal plate, such as a stainless steel, so that it can resist contact with an obstacle during a run.

In this Embodiment, a protection bush 46 made of nylon is attached to the entire circumference of the hole 45 of the bracket 4. Thus, the abrasion between the shaft 3 and the bracket 4 can be reduced by using nylon as a material of the portion contacting each other when sliding.

Embodiment 3

According to Embodiment 3, a shaft holding component 48 with a circular hole whose edge is rounded is attached instead of the protection bush 46.

(*a*) of FIG. 8 shows a structure of the vehicle speed detection unit 1 according to Embodiment 3, (*b*) of FIG. 8 is a cross sectional view at a-b of (*a*) of FIG. 8, and (*c*) of FIG. 8 is a perspective view of the shaft holding component 48.

If the hole shape is square, the range of contacting between the shaft 3 and the shaft holding component 48 is restricted, resulting in concentration of load of the abrasion. For this reason, in this Embodiment, the hole shape of the shaft holding component 48 is circular, and the edge of the opened circle is processed to be round. Thereby, abrasion resistance can be increased more than that of the protection bush 46 made of nylon.

Furthermore, oil liquid, such as grease, may be applied to the contact part of the shaft 3 and the bracket 4.

Alternatively, the shaft 3 may be a soft pipe, such as a water hose, to have a structure to follow a relative displacement between the vehicle body and the wheel 10. As long as it is structured so that no rigid body can slide in the shaft part, the problem of slide abrasion can be reduced.

Thus, in the vehicle speed detection unit 1 according to Embodiments 1 to 3, the shaft 3 is arranged approximately perpendicular to the road surface while being offset from the center of the axle by a predetermined amount, the lower end of the shaft is connected to the main body of the vehicle speed detection unit (rotary encoder) through the elastic body 27, the upper end of the shaft 3 is covered with the bracket of a box shape which is attached to the vehicle body, the upper end of the shaft is arranged to pass through the hole provided in the lower end of the bracket and to be able to freely move in the up and down direction in the hole, and the cable for outputting a measurement result of the vehicle speed detection main body (rotary encoder) passes through the hollow of the shaft so as to be clamped to the bracket. Therefore, it is possible to prevent the shaft from being accidentally bent or broken, thereby obtaining a measurement result of an accurate vehicle speed output by the vehicle speed detection unit 1 even when the vehicle body and the wheel 10 are relatively displaced in the left-and-right and up-and-down directions during a vehicle run.

Further, in Embodiments 1 to 3, the rotary encoder is used for detecting an angle to detect a vehicle speed. However, it is not limited to the rotary encoder, and other one, such as a DC tacho (DC tachogenerator) or a resolver, may also be used.

Thus, the vehicle speed detection unit 1 according to Embodiments 1 to 3 has the feature of including the vehicle speed detecting part 2 which is installed in the vehicle 50 and measures an axle rotation angle of the vehicle 50, the tubular shaft 3 through which there is passed an output cable for outputting a measurement result of the vehicle speed detecting part 2, and the cover (bracket 4) which is attached to the vehicle 50 to cover and protect the shaft 3, wherein one end of the shaft 3 is connected to the vehicle speed detecting part 2, at the position offset from the axle 11 by a predetermined amount in the vehicle forward direction or backward direction, and the other end passes through a hole provided in the cover so as to be held approximately perpendicular to the road surface.

Embodiment 4

FIGS. 9 and 19 show the state where the vehicle speed detection unit 1 according to Embodiment 4 is externally attached to the vehicle 50.

In the figure, an over fender 51 made of resin is attached to the periphery of a fender 52 made of a metal plate having a predetermined strength, on the side of a vehicle body 55 configuring the vehicle 50. The wheel 10 includes a wheel-body 13 with a tire 14 attached, and an axle 11, and is stored in a wheel house (53). The wheel-body 13 is fastened and fixed to an axle hub (65) of the axle 11, with the wheel nut 61. The vehicle speed detection unit 1 includes the bracket 4 used as a vehicle attachment to the vehicle body 55, the vehicle speed detecting part 2, and a rotary linkage mechanism 30 (an example of the shaft 3) made of metal. The bracket 4 is attached to a predetermined part of the periphery of the fender 52, to be lower than the bottom part of the over fender 51 attached to the vehicle body 55. The vehicle speed detecting part 2 is attached to the wheel nut 61, and fastened and fixed to the wheel nut 61 with a fixing bolt 66. The signal output cable 26 of the vehicle speed detecting part 2 is held by the rotary linkage mechanism 30, to be wired in the bracket 4 and drawn into the vehicle 50 through the inside of the bracket 4.

Although any one of the front and rear wheels of the vehicle 50 can be the wheel 10 to which the vehicle speed detection unit 1 is attached, it is preferable to be attached to the rear wheel where a relative displacement between the vehicle body and the tire is comparatively small, avoiding to be attached to the front wheel which is used for steering the vehicle 50.

FIG. 10 shows a structure of the vehicle speed detection unit 1. (*a*) of FIG. 10 is a front sectional view of the vehicle speed detection unit 1 when the vehicle on a road surface 100 is viewed from the front. (*b*) of FIG. 10 is a side view of the vehicle speed detection unit 1 when the vehicle is viewed from the side (vehicle width direction). In (*b*) of FIG. 10, a part of a protective cover 43 of the bracket 4 is shown as a broken view. FIG. 11 is a sectional view showing a structure of the vehicle speed detecting part 2, and shows a simplified structure of the circumference of the rotary encoder 21. The sign 25 denotes a rotating shaft of the axle 11.

First, the structure of the vehicle speed detection unit 1 will be explained. In (*a*) of FIG. 10, the wheel house 53 is provided below the fender 52, and the wheel-body 13 is stored in the space of the wheel house 53. The axle 11 which constitutes the wheel 10 includes the axle hub 65 at the end. The axle hub 65 performs a rotation about the rotating shaft 25, with respect to the vehicle body 55. The wheel-body 13 is fastened and fixed to the axle hub 65 with the wheel nut 61. A female screw (not shown) is provided in the wheel nut 61.

In (*a*) and (*b*) of FIG. 10, the vehicle speed detecting part 2 includes a metal attachment hub 62, and also includes a metal hollow holder 63 and a metal holding bracket 64 which constitute a holding tool. The holding bracket 64 forms a shape of layered cylinders of different diameters, and has a projection protruding toward the outside from the axle 11. In the projection of the holding bracket 64, a bar member is provided such that it horizontally protrudes forward or backward from the vehicle. The attachment hub 62 is fastened and fixed to the wheel nut 61 with the fixing bolt 66 which engages the female screw of the wheel nut 61.

The rotary linkage mechanism 30 is connected between the holding bracket 64 of the vehicle speed detecting part 2 and the protective cover 43 of the bracket 4, and is configured by a first link 31, a second link 32, a first rotating joint (coupling) 34, a second rotating joint (coupling) 33, and a third rotating joint (coupling) 35, all of which are made of metal. The first link 31 and the second link 32 are rotatably connected in between their ends facing each other, by the first rotating joint 34 which has at least one degree of rotational freedom. The other end of the first link 31 is connected to the end of the bar member provided in the holding bracket 64 through the second rotating joint 33. That is, the other end of the first link 31 is pivotally held to the holding bracket 64 by the second rotating joint 33 which has at least one degree of rotational freedom. The third rotating joint 35 includes a rotating part and an attaching part rotatably connected to the rotating part. The other end of the second link 32 is connected to the end of the attaching part of the third rotating joint 35.

It is preferable, at the normal time, to constitute the rotary linkage mechanism 30 so that the longitudinal direction of the first link 31 may be arranged horizontally and the longitudinal direction of the second link 32 may be arranged perpendicularly.

Moreover, the first link 31 forms a bar, such as a square bar, a round bar, and a bar whose section is polygonal, and there is formed a gutter (not shown) providing a space for holding the signal output cable 26 on the side in the longitudinal direction. Then, the signal output cable 26 is stored and held in this gutter. The second link 32 forms a bar, such as a square bar, a round bar, and a bar whose section is polygonal. It is preferable that the second link 32 is configured by engaging a rod having a male screw with a rod having a female screw in order to be able to adjust the length by extending or contracting in the longitudinal direction.

The bracket 4 includes a metal bracket 41 serving as an attaching stationary plate for attachment to the vehicle body 55, a metal guide 42, and the metal protective cover 43. The wedge shape upper end of the bracket 41 is attached, and held and fixed to a predetermined portion in the periphery of the fender 52, at the position offset forward or backward and upward (that is, diagonally upward) of the vehicle, with respect to the rotating shaft 25 of the axle 11. The lower end of the bracket 41 is arranged to hang just down from the attachment part of this fender 52. The third rotating joint 35 is attached to the protruding portion on the upper surface of the bracket 41, at the position between the wheel 10 and the internal wall of the wheel house 53 seen from the vehicle width direction. In addition, it is preferable that the outward surface of the bracket 41 is arranged so that a height difference in the vehicle width direction may become small with respect to the protruding portion of the holding bracket 64.

The other end of the second link 32 is pivotally held to the bracket 41 by the third rotating joint 35. The rotating part of the third rotating joint 35 is arranged lower than the bottom part of the boundary line between the fender 52 and the wheel house 53, at a diagonally upper position with respect to the rotating shaft 25 of the axle 11. The rotating part of the third rotating joint 35 is arranged upper than the first rotating joint 34.

Moreover, the first rotating joint 34 is arranged to be lower than the line connecting the rotating part of the third rotating joint 35 and the rotating shaft 25 (or its coaxial rotating shaft of the rotor 211). Moreover, the first rotating joint 34 is arranged to be lower than the lower end of the bracket 41. Thereby, the rotary linkage mechanism 30 operates in accordance with running of the vehicle 50, and the second link 32 does not contact to interfere with the lower end of the bracket 41 even if the lower end of the second link 32 is displaced in the vehicle width direction of the vehicle 50 (sheet anteroposterior direction of (*b*) of FIG. 10), using the third rotating joint 35 as a fulcrum.

The protective cover 43 is held and fixed to the bracket 41 by screw cramping, and covers a part of the other end of the first link 31, and all of the first rotating joint 34, the second link 32, the bracket 41, the guide 42, and the third rotating joint 35. Specially, the second link 32 is completely covered with the protective cover 43 in order to cut off the contact with the exterior.

In addition, the protective cover 43 can be detached and attached to the bracket 41, without removing the connection of the first and second links 31 and 32, and each rotating joint.

The guide 42 formed by shaping a metal plate to be convex is attached to the edge of the lower end of the bracket 41 which is lower than the third rotating joint 35. The guide 42 protrudes from the attachment surface of the bracket 41, forms a space against the bracket 41, and contactlessly encloses a part of the second link 32 by the bracket 41 and the inside of the guide 42. That is, the second link 32 is arranged to penetrate the space which is formed by being enclosed by the guide 42 and the bracket 41. In the internal surface of the guide 42 which contacts this space, a shock absorbing material (not shown) made of silicon rubber is provided.

The guide 42 is provided to restrict movement of the second link 32 in the vehicle width direction, as a protective measure in the event of an abnormal occurrence.

Since the vehicle speed detection unit 1 is arranged close to the wheel 10, if some malfunction occurs in the rotary linkage mechanism 30 and then the rotary linkage mechanism 30 approaches the tire 14 exceedingly from the assumed range, thereby the tire 14 will burst because the rotary linkage mechanism 30 contacts it.

Moreover, if unexpected load is added to the rotary linkage mechanism 30 and consequently the rotary linkage mechanism 30 is removed, it will jump out of the vehicle body only to be on the road.

In order to avoid such an unexpected situation, the guide 42 is provided in the vehicle speed detection unit 1 according to Embodiment 4, for preventing the rotary linkage mechanism 30 from being protruded in the vehicle width direction. In this situation, the guide 42 has a function of restricting movement of the second link 32 in the vehicle width direction.

Moreover, the rotary linkage mechanism 30 is protected not to contact an obstacle or a feature outside the vehicle since the protective cover 43 is provided in order to protect a part of the first link 31 and all of the second link 32, the first rotating joint 34 and the third rotating joint 35. This protective cover 43 also has a function of restricting the first link 31 to move in the vehicle width direction.

Furthermore, by providing a mechanical rotation angle limiter inside the third rotating joint 35, the rotation angle range itself of the rotary linkage mechanism 30 can also be restricted.

The degree of rotational freedom of the third rotating joint 35, the first rotating joint 34, and the second rotating joint 33 is set to be totally five degrees of freedom, and the rotary linkage mechanism 30 has five degrees of rotational freedom which are mutually independent. Thus, the rotary linkage mechanism 30 of high reliability can be configured as described later.

The first link 31 generally performs a rotation about the Z-axis in the figure so that it may be displaced in the vehicle width direction (vehicle right-and-left direction) of the vehicle 50, with respect to the wheel 10, using the second rotating joint 33 as a fulcrum. Moreover, the first link 31 generally performs a rotation about the X-axis (axis parallel to the rotating shaft 25) in the figure so that it may be displaced up and down of the vehicle 50, with respect to the second link 32, using the first rotating joint 34 as a fulcrum. The second link 32 generally performs a rotation about the X-axis in the figure so that it may be displaced in the forward and backward direction and the vehicle width direction (right-and-left direction) of the vehicle 50, using the third rotating joint 35 as a fulcrum.

The reason for having described to generally perform a rotation about the X-axis and the Z-axis is because, by the vehicle speed detecting part 2's rotational displacement with respect to the vehicle body 55, on the axial center of the axle 11, or by the first and second links 31 and 32's rotational displacement by each rotating joint, a local coordinate system fixed to each link rotates, and practically the rotating shaft of each rotating joint is rotationally displaced in the state inclined with respect to the coordinate system of the XYZ axes fixed in the inertial space.

In this Embodiment 4, it is preferable to use, for example, a pin hinge which rotates with one degree of rotational freedom, as the first rotating joint 34 and the second rotating joint 33. Moreover, as the third rotating joint 35, it is preferable to use, for example, a spherical universal coupling (ball joint) which is pivotally supported by a spherical bearing and performs a rotation about the three axes to have three degrees of rotational freedom, in order to be utilized as a combination with the first rotating joint 34 and the second rotating joint 33 using pin hinges.

Herein, the degree of rotational freedom of the first rotating joint 34 is one, that of the second rotating joint 33 is one, and that of the third rotating joint 35 is three.

In this case, the rotating shaft of the second rotating joint 33 is arranged to intersect perpendicularly to both the rotating shaft 25 of the axle 11 (that is, the rotating shaft of the rotor 211) and the longitudinal direction axis of the first link 31. Moreover, the rotating shaft of the first rotating joint 34 is arranged to intersect perpendicularly to both the longitudinal direction axis of the first link 31 and the rotating shaft of the second rotating joint 33.

Next, the structure of the vehicle speed detecting part 2 will be explained.

In FIG. 11, the vehicle speed detecting part 2 stores and holds the rotary encoder 21. The rotary encoder 21 includes a stator 212 which constitutes the main body, the rotor 211, and the signal output cable 26 connected to the stator 212. The rotor 211 forms a rotating shaft rotatably held to the stator 212. If the rotor 211 rotates relatively to the stator 212, the rotary encoder 21 generates a pulse signal according to a predetermined minute rotation angle displacement of the rotor 211, and outputs the pulse signal outside through the signal output cable 26.

Thus, the rotary encoder 21 is used as a rotation pulse signal generator for generating a pulse signal according to the degree of rotation angle. As the rotary encoder 21, it is preferable to use a high performance angle sensor which generates, for example, 10,000 pulses per one rotation (one turn) and can detect 0.036 degrees ( ) as a minute rotational displacement.

As the rotary encoder 21, any one of the incremental method and the absolute method may be used depending upon the precision required for speed detection. Moreover, as the rotary encoder 21, any one of an optical type one and a potentiometer may be used. Furthermore, as the rotary encoder 21, a magnetic encoder or a resolver may be used.

The holder 63 stores the rotary encoder 21 in the hollow space, and the stator 212 of the rotary encoder 21 is attached to it, and the stator 212 of the rotary encoder 21 is held and fixed to it. The holding bracket 64 is attached and fixed to the holder 63, and, in a water-tight state, it encloses the rotary encoder 21, with the holder 63. The signal output cable 26 of the rotary encoder 21 protrudes outside the holder 63 through the hole (not shown) provided in the holder 63. This hole is filled with a potting material or putty, to keep the water tight. The holder 63 and the holding bracket 64 are unified to be connected to the second rotating joint 33, and to the other end of the first link 31. The rotor 211 has one degree of rotational freedom with respect to the holding bracket 64 of the vehicle speed detecting part 2.

Moreover, the holder 63 is pivotally held to the attachment hub 62 through the bearing 22.

In this situation, it is preferable to prepare a rotation seal, such as a labyrinth seal, an oil seal, and a V ring, between the holder 63 and the attachment hub 62 so that neither water nor a foreign substance may mix in the bearing 22. The rotor 211 of the rotary encoder 21 is held to the attachment hub 62 by a shaft coupling 213. Thereby, the rotor 211 is connected to the attachment hub 62 of the vehicle speed detecting part 2 so as to perform rotation. As described above, the attachment hub 62 engages the wheel nut 61 connected to the wheel stud 60 of the axle hub 65, and is fixed to the wheel nut 61 with the fixing bolt 66.

Thus, the rotor 211 of the rotary encoder 21 is connected to the axle hub 65 through the attachment hub 62.

Since the rotating shaft of the holder 63 which is pivotally supported by the bearing 22 is arranged to be concentric with the rotating shaft of the rotor 211, consequently the rotating shaft of the rotor 211 becomes concentric with the rotating shaft 25 of the axle 11. Although not shown, it is preferable to configure the shaft coupling 213, by using a flexible coupling, Oldham's coupling, etc., so that core vibration of the rotating shaft of the rotor 211, with respect to the rotating shaft of the holder 63, may be allowed.

After having been protruded from the holder 63, the signal output cable 26 of the rotary encoder is stored and held in the gutter in the first link 31 on the periphery of the second rotating joint 33. The signal output cable 26 held by the first link 31 is wired into the bracket 4 covered with the protective cover 43, through this gutter. Therefore, the signal output cable 26 can be protected from the contact with the exterior by the protective cover 43. In the connection part between the first link 31 and the second rotating joint 33, since the movable angle of the first link 31 is small as mentioned later, the signal output cable 26 hardly receives stress caused by movement of the link.

Moreover, inside the bracket 4, after being banded with a part of the second link 32, the signal output cable 26 held by the first link 31 is suitably banded by the bracket 41 in the bracket, to be drawn into the vehicle. In this situation, it is preferable to secure a sufficient surplus length for the bent portion of the cable inside the bracket 4 so that the signal output cable 26 may not receive stress caused by movement of the rotary linkage mechanism 30.

Next, the operation of the vehicle speed detection unit 1 according to this Embodiment 4 will be explained.

The attachment hub 62 is connected to the axle hub 65 which holds the wheel-body 13. Therefore, when the vehicle 50 moves forward or backward, the tire 14 rolls on the road surface 100, and the wheel-body 13 held by the axle hub 65 rotates with respect to the vehicle body 55, the attachment hub 62 of the vehicle speed detecting part 2 rotates in conjunction with the rotation of the wheel-body 13. In accordance with the rotation of the attachment hub 62, the rotor 211 of the rotary encoder 21 rotates.

At this time, since the holding bracket 64 of the vehicle speed detecting part 2 is connected to the first link 31 of the rotary linkage mechanism 30, a rotation about the axial center where the rotating shaft 25 of the axle 11 is virtually fixed to the vehicle body 55 is stopped in an engaged state.

Thereby, with rotation of the holder 63 fixed to the holding bracket 64, rotation of the stator 212 of the rotary encoder 21 held inside is stopped in an engaged state. Thus, the configuration is such that the rotor 211 of the rotary encoder 21 rotates with the rotation of the tire 14, and a relative rotation of the stator 212 of the rotary encoder 21 is stopped, regardless of the rotation of the tire 14, with respect to the axial center where the rotating shaft 25 of the axle 11 is virtually fixed to the vehicle body 55.

In this way, the rotary encoder 21 generates a pulse signal according to the rotation of the rotor 211, and outputs the pulse signal to a signal processing unit 90 installed in the vehicle, through the signal output cable 26.

The signal processing unit 90 samples an input signal from the signal output cable 26, based on an internal clock signal, and can generate a highly precise vehicle speed pulse of 100 Hz, for example, by integrating the sampled pulse signals.

Moreover, when the vehicle is running, the relative position and posture of the tire 14 with respect to the vehicle body 55 changes because of a posture change of the tire 14 or the vehicle body 55 by repulsion from a sudden stop or the road surface 100, an action change of the rear wheel associated with a steering operation of the front wheel of the vehicle 50, and a posture change of the rear wheel caused by the control operation of the traction control system (TCS) and the antiskid brake system (ESC; electronic stability control system). Even when change of the relative position and posture occurs, since the rotary linkage mechanism 30 operates not to give an excessive load to the connection part between the vehicle speed detecting part 2 and the bracket 41, the vehicle speed detecting part 2's position change and posture change with respect to the vehicle body 55 are high precisely followed, thereby obtaining a high reliability of the operation.

This enables, even when posture of the tire 14 changes with respect to the vehicle body 55, to prevent the stator 212 of the rotary encoder 21 from rotating relatively to the axial center where the rotating shaft 25 of the axle 11 is virtually fixed to the vehicle body 55, thereby highly precisely detecting a rotational displacement and a rotation speed of the tire 14.

Moreover, since an excessive load does not act on the connection part between the vehicle speed detecting part 2 and the rotary linkage mechanism 30, nor on the connection part between the connection part of the bracket 41 and the rotary linkage mechanism 30, it is possible to prevent the connection part from being damaged, thereby obtaining the vehicle speed detection unit 1 with high durability.

The rotary linkage mechanism 30 operates like a manipulator having five degrees of rotational freedom with respect to the bracket 41 of the bracket 4 fixed to the vehicle body 55. Under this circumstance, the rotor 211 of the rotary encoder 21 held by the vehicle speed detecting part 2 has one degree of rotational freedom. Therefore, if the rotary linkage mechanism 30 and the vehicle speed detecting part 2 are combined, the rotor 211 of the rotary encoder 21 operates like a hand of the manipulator having six degrees of rotational freedom with respect to the bracket 41. Thus, since the vehicle speed detection unit 1 follows a posture change of the tire 14 (wheel 10), it becomes possible to hold the rotor 211 of the rotary encoder 21 to the vehicle body 55, so as to perform a rotation about the rotating shaft 25 of the axle 11.

Next, the action of the vehicle speed detection unit 1 during vehicle running will be explained.

FIG. 12 shows actions of the rotary linkage mechanism 30 while the vehicle is running. (*a*) of FIG. 12 shows a positional relationship between the rotary linkage mechanism 30 and the bracket 4 in an equilibrium state (neutral point) where the weight balance is maintained while the vehicle 50 is stopped. (*b*) of FIG. 12 shows a positional relationship between the rotary linkage mechanism 30 and the bracket 4 in a state where the shock absorber (also just called an absorber) of the vehicle contracts to the maximum. (*c*) of FIG. 12 shows a positional relationship between the rotary linkage mechanism 30 and the bracket 4 in a state where the shock absorber extends to the longest. (*d*) of FIG. 12 shows a state where the tire is displaced backward because the vehicle body 55 is depressed by a sudden stop, etc. (*e*) of FIG. 12 shows a state where the tire is displaced backward because the vehicle body 55 floats by running on a forward bump, etc when the vehicle is advancing. (*f*) of FIG. 12 is a figure of the vehicle 50 viewed from the front, and shows a state where the tire 14 at the right rear is displaced rightward with respect to the vehicle body 55 because the vehicle 50 received acceleration in the vehicle width direction (right-and-left direction of the vehicle) when proceeding in a curve.

As shown in FIG. 12, as relative displacement between the vehicle body 55 and the tire 14, there are displacement in the up and down direction, displacement in the running direction, and displacement in the vehicle width direction. Specifically, the displacement in the up and down direction is the state where the shock absorber extends and the vehicle body floats during vehicle running ((c) of FIG. 12), and the state where the shock absorber contracts and the vehicle body sinks ((b) of FIG. 12). The displacement in the running direction is the state where the tire 14 is displaced forward or backward with respect to the vehicle body 55 at the time of running on a bump, stopping suddenly, etc. ((d) and (e) of FIG. 12). The displacement in the vehicle width direction is the state where the tire 14 is displaced in the direction of the vehicle width with respect to the vehicle body 55 at the time of running in a curve, or skidding of the tire ((f) of FIG. 12).

In the vehicle speed detection unit 1 according to Embodiment 4, since the vehicle speed detecting part 2 attached to the wheel 10 is supported to the vehicle body 55 by using the rotary linkage mechanism 30 with five degrees of rotational freedom, it is possible for the vehicle speed detecting part 2 to move and follow the relative displacement between the vehicle body 55 and the tire 14 in any of the above states.

For example, when the vehicle body 55 and the tire 14 are relatively displaced in the up and down direction, by letting the first and second links 31 and 32 rotate around the first rotating joint 34 and the third rotating joint 35, the vehicle speed detecting part 2 supported by the rotary linkage mechanism 30 moves in the up and down direction with respect to the vehicle body 55, thereby following the relative displacement between the vehicle body and the tire (refer to (b) and (c) of FIG. 12).

Moreover, when the vehicle body 55 and the tire 14 are relatively displaced in the forward and backward direction of the vehicle running, by letting the first and second links 31 and 32 rotate around the first rotating joint 34 and the third rotating joint 35, the vehicle speed detecting part 2 supported by the rotary linkage mechanism 30 moves in the forward and backward direction with respect to the vehicle body 55, thereby following the relative displacement between the vehicle body and the tire (refer to (d) and (e) of FIG. 12).

Furthermore, when the vehicle body 55 and the tire 14 are relatively displaced in the width direction of the vehicle, by letting the first and second links 31 and 32 rotate around the second rotating joint 33 and the third rotating joint 35, the vehicle speed detecting part 2 supported by the rotary linkage mechanism 30 moves in the vehicle width direction with respect to the vehicle body 55, thereby following the relative displacement between the vehicle body and the tire (refer to (f) of FIG. 12).

In any of the cases, in order that the rotary linkage mechanism 30 may operate within the range where the second link does not interfere with the guide 42 nor with the bracket 41, the lengths of the first link 31, the second link 32, and the bracket 41, and the installation positions of each link, each rotating joint, and the bracket 41 are adjusted at the time of designing or manufacturing.

Next, a further effect of the action of the vehicle speed detection unit 1 according to Embodiment 4 will be explained. FIG. 13 typically shows a structure of the rotary linkage mechanism 30 with five degrees of rotational freedom according to Embodiment 4. In the figure, the symbol denoting the rotating joint is based on the Industrial robots Graphical symbols of mechanism (JISB0138). In the state shown in the figure, the second rotating joint 33 can rotate about one axis of the up-and-down axis, the first rotating joint 34 can rotate about one axis of the right-and-left axis, and the third rotating joint 35 can rotate about three axes of the right-and-left axis, the up-and-down axis, and the front-and-back axis, respectively.

In the preferable example of this Embodiment 4, as shown in the figure, by setting the third rotating joint 35 to have three degrees of rotational freedom, and setting the first rotating joint 34 and the second rotating joint 33 to have one degree of rotational freedom, the first rotating joint 34 and the second rotating joint 33 are configured by pin hinges of small number of parts, and the third rotating joint 35 is configured by a ball joint of small number of parts, so as to attach the rotary linkage mechanism 30 to the bracket 4. By this, it is possible to reduce the number of parts of the rotary linkage mechanism 30 with five degrees of rotational freedom and to achieve both weight saving and low pricing in addition to high reliability.

Moreover, by configuring the rotation link as shown in the figure, it becomes possible to follow a vehicle body vibration in the up and down direction where the relative displacement between the vehicle body and the tire becomes the largest in the posture change of the vehicle body 55, by mainly just moving the first link 31, thereby narrowing the movement range of the second link 32. Moreover, since relative displacement between the vehicle body 55 and the tire in the vehicle width direction is small compared with relative displacement in the up and down direction, it is possible to hold down the movable angle of the first link 31 to be small at the connection part between the first link 31 and the second rotating joint 33.

As a result, since the second link 32 and the protective cover 43 for protecting the internal parts of the bracket 4 can be downsized, the tire 14, which is hidden by the vehicle speed detection unit 1, can have a larger exposure surface. By this, facility of operational maintenance in exchanging tires can be increased.

In the vehicle speed detection unit 1 according to Embodiment 4 shown in FIGS. 9 to 13, in the wheel housing of 15 to 17 inches, it is possible to make the width of protrusion caused when the bracket 4 covering the rotary linkage mechanism 30 protrudes in the vehicle width direction from the vehicle body be less than or equal to 50 mm. Thus, since the width in the vehicle width direction of the over fender 51, where the vehicle speed detection unit 1 is stored at the lower part thereof, can be less than or equal to 50 mm, it is not necessary to use a special vehicle whose vehicle width is wider than needed.

FIG. 14 shows a contrast between a link configuration of the rotary linkage mechanism 30 according to Embodiment 4 and another link configuration having the same degree of rotational freedom. (a) of FIG. 14 shows a link configuration of the rotary linkage mechanism 30 according to Embodiment 4, and (b) of FIG. 14 shows a link configuration of a different rotary linkage mechanism 300 with the same degree of rotational freedom.

In (a) and (b) of FIG. 14, each component (the first link 31, the second link 32, the first rotating joint 34, the second rotating joint 33, and the third rotating joint 35) which configures the rotary linkage mechanism 300 can be the same one used in the rotary linkage mechanism 30.

However, a bracket 400 of (b) of FIG. 14 differs from the bracket 4 of the rotary linkage mechanism 30 in the respect of the attachment direction of the second link 32 supported by the third rotating joint 35. That is, in the rotary linkage mechanism 300 of (b) of FIG. 14, it is arranged so that the longitudinal direction of the second link 32 may become horizontal and the longitudinal direction of the first link 31 may become perpendicular. In this case, in the rotary linkage mechanism 300 of (b) of FIG. 14, the first rotating joint 34 is arranged to be upper than a straight line 110 which connects the rotating shaft 25 (or the rotating shaft of the rotor 211) of the axle 11 and the rotating shaft of the third rotating joint 35.

On the other hand, in the rotary linkage mechanism 30 of (a) of FIG. 14, it is arranged so that the longitudinal direction of the second link 32 may become perpendicular and the longitudinal direction of the first link 31 may become perpendicular. In this case, in the rotary linkage mechanism 300 of (a) of FIG. 14, the first rotating joint 34 is arranged to be lower than the straight line 110 which connects the rotating shaft 25 (or the rotating shaft of the rotor 211) of the axle 11 and the rotating shaft of the third rotating joint 35.

Thus, when the rotary linkage mechanism is configured by using the same rotating joint and link, there are two types of link arrangement relations, and their movable ranges of the links with respect to the vehicle body 55 are different.

In the rotary linkage mechanism 30 of (a) of FIG. 14, when the vehicle body 55 moves up and down with respect to the tire 14, as shown by the vertical arrow in the figure, the maximum movable range of the ends of the first and the second links 31 and 32 becomes 51 being equivalent to the distance between the rotating shaft 25 (or the rotating shaft of the rotor 211) of the axle 11 and the road surface 100.

On the other hand, in the rotary linkage mechanism 300 of (b) of FIG. 14, when the vehicle body 55 moves up and down with respect to the tire 14, as shown by the vertical arrow in the figure, the maximum movable range of the ends of the first and the second links 31 and 32 becomes 52 being equivalent to the distance between the wheel house 53 and the upper end of the second links 31 and 32.

Therefore, when the vehicle body moves up and down, the link maximum movable range (51) in the case of the link configuration of the rotary linkage mechanism 30 shown in (a) of FIG. 14 is greater than that ($\delta 2$) in the case of the link configuration of the rotary linkage mechanism 300 shown in (b) of FIG. 14 ($\delta 1 > \delta 2$).

When the vehicle body and the tire are relatively displaced in the forward and backward direction, the maximum movable range of the rotary linkage mechanism 300 shown in (b) of FIG. 14 is larger than that of the rotary linkage mechanism 30 shown in (a) of FIG. 14.

However, regarding the relative displacement between the vehicle body and the tire, relative displacement in the up and down direction is the largest, and compared with this, relative displacement in the vehicle width direction and relative displacement in the forward and backward direction are remarkably small. For this reason, practically, the rotary linkage mechanism 30 can obtain a link maximum movable range larger than that of the rotary linkage mechanism 300.

As described above, the vehicle speed detection unit 1 according to Embodiment 4 has the feature of including the rotary encoder 21 whose rotor 211 (rotating shaft) is connected to the wheel 10 of the vehicle 50, the holder 64 which holds the stator 212 of the rotary encoder 21, the first and second links 31 and 32 which are rotatably connected with having the first rotating joint 34 with at least one degree of rotational freedom, the bracket 4 (vehicle attachment) attached and fixed, diagonally upward of the axle 11 of the wheel 10, to the periphery of the fender 52 of the vehicle body 55 of the vehicle 50, and the second and third rotating joints 33 and 35 which hold the first and second links 31 and 32 therebetween and connect the ends of the first and second links 31 and 32 to the holder 64 and the bracket 4 respectively, wherein the degree of rotational freedom of the first, second, and third rotating joints 34, 33, and 35 is totally five degrees of rotational freedom.

More preferably, the vehicle speed detection unit 1 has the feature of including the rotary encoder 21, the attachment hub 62 for connecting the rotor 211 of the rotary encoder 21 to the wheel 10 of the vehicle 50, the holder 64 (holding tool) for holding the stator 212 (main body) of the rotary encoder 21, the first link 31 rotatably connected to the holder 64, to rotate about the axis of the second rotating joint 33 which intersects perpendicularly to the first link 31's longitudinal direction and the rotor 211 of the rotary encoder 21 and has one degree of rotational freedom, the second link 32 rotatably connected to the first link 31 to rotate about the axis of the first rotating joint 34 which intersects perpendicularly to the first link 31's longitudinal direction and the axis of the second rotating joint 33 and has one degree of rotational freedom, and the bracket 4 which includes the third rotating joint 35 having three degrees of rotational freedom, rotatably holds the second link 32 around the third rotating joint 35 and can be attached to the vehicle body 55 of the vehicle 50, wherein the third rotating joint 35 is arranged offset forward or backward of the vehicle 50, with respect to the rotor 211 of the rotary encoder 21, and the first rotating joint 34 is arranged lower than the line connecting the axis of the rotor 211 of the rotary encoder 21 and the third rotating joint 35.

Thereby, it is possible to prevent occurrence of bending and damage in the rotary linkage mechanism 30 during vehicle running and to certainly output, from the rotary encoder 21, a pulse signal of high precision in accordance with rotational displacement of the wheel-body 13. Thus, the measurement result of a vehicle speed pulse measured based on an output signal of the vehicle speed detection unit 1 can acquire the high precision more stably, thereby obtaining a highly precise and reliable position measurement result by performing dead reckoning using the obtained vehicle speed pulse.

Moreover, since the rotary linkage mechanism 30 can be arranged such that relative displacement in the up and down direction of the vehicle body and the tire is not interfered, and since the movable range of the rotary linkage mechanism 30 is small, it is possible to make the width of protrusion caused when the bracket 4 covering the rotary linkage mechanism 30 protrudes from the vehicle body thin to be less than or equal to 50 mm.

Furthermore, since a part of the first link 31 and the whole of the second link can be covered by protrudingly providing the bracket 4 on the vehicle body within the range narrower than the width in the vehicle width direction at the fender, it is possible to protect the rotary linkage mechanism 30 from an external obstacle. Moreover, it is possible to protect the signal output cable 26 from an external obstacle and secure a wiring route, by using the bracket 4.

Since the bracket 4 (vehicle attachment) includes the bracket 41 (attaching stationary plate) which hangs down from the lower part of the over fender 51 of the vehicle 50 to be attached to the periphery of the fender 52 of the vehicle 55, diagonally upward of the axle 11 of the wheel 10, the protective cover 43 which is attached to the bracket 41 to cover the bracket 41 and the second link 32, and the guide 42 which is protrudingly provided between the protective cover 43 and the bracket 41, to have a space against the bracket 41 in order to contactlessly encloses a part of the second link 32, with the bracket 41, it becomes possible to protect the rotary linkage mechanism 30 so as not to contact with the tire, an obstacle outside the vehicle, a feature, etc.

Embodiment 5

Regarding the vehicle speed detection unit 1 according to Embodiment 4, there has been described a structure example of the rotary linkage mechanism 30 in reference to FIG. 13, where degrees of rotational freedom are selected respectively to be one degree for the first rotating joint 34, one degree for the second rotating joint 33, and three degrees for the third rotating joint 35. In this Embodiment 5, there will be described a structure example of a rotary linkage mechanism 301 with five degrees of rotational freedom in reference to FIG. 15, where degrees of rotational freedom are selected respectively to be two degrees for the first rotating joint 34, one degree for the second rotating joint 33, and two degrees for the third rotating joint 35.

In addition, the structure and the operation of the rotary linkage mechanism 301 are the same as those of the rotary linkage mechanism 30 described in Embodiment 4 except for the point of having different degrees of rotational freedom of the second and third rotating joints 33 and 35.

FIG. 15 typically shows a structure of the rotary linkage mechanism 301 according to Embodiment 5. In the figure, the symbol denoting the rotating joint is based on the Industrial robots Graphical symbols of mechanism (JISB0138).

In FIG. 15, the rotary linkage mechanism 301 is configured by rotating joints, where each of the first rotating joint 33 and the third rotating joint 35 is configured by two pin hinges to have two degrees of rotational freedom, and the first rotating joint 34 is the same as that in FIG. 13. The protective cover 43 covers and protects a part at the end of the first link 31, and all of the second link 32, the first rotating joint 34, and the third rotating joint 35.

Moreover, in the state shown in FIG. 15, the second rotating joint 33 can rotate about two axes of the up-and-down axis and the front-and-back axis, the first rotating joint 34 can rotate about one axis of the right-and-left axis, and the third rotating joint 35 can rotate about two axes of the up-and-down axis and the right-and-left axis, respectively.

Thus, the vehicle speed detection unit 1 according to Embodiment 5 includes the rotary encoder 21, the attachment hub 62 for connecting the rotor 211 of the rotary encoder 21 to the wheel 10 of the vehicle 50, the holder 63 and the holding bracket 64 which are attached to the stator 212 of the rotary encoder 21, the first link 31 which includes the second rotating joint 33 intersecting perpendicularly to the rotor 211 of the rotary encoder 21 and having two degrees of rotational freedom, and which is rotatably held to the holder 63 and the holding bracket 64, around the second rotating joint 33, the second link 32 rotatably connected to the first link 31, to rotate about the axis of the first rotating joint 34 which intersects perpendicularly to the second link 32's longitudinal direction and the first link's longitudinal direction and has one degree of rotational freedom, and the bracket 4 which includes the third rotating joint 35 having two degrees of rotational freedom, rotatably holds the second link 32, around the third rotating joint 35, and can be attached to the vehicle body 55 of the vehicle 50, wherein the third rotating joint 35 is arranged offset forward or backward of the vehicle 50, with respect to the rotor 211 of the rotary encoder 21, and the first rotating joint 34 is arranged lower than the line connecting the rotor 211 of the rotary encoder 21 and the third rotating joint 35.

The rotary linkage mechanism 301 according to Embodiment 5 shown in FIG. 15, as well as the rotary linkage mechanism 30 according to Embodiment 4 shown in FIG. 13, can follow vibration in the up and down direction that is the largest in the vibration of the vehicle 50 by mainly just moving the first link 31, thereby narrowing the movement range of the second link 32. In addition, since it is possible to set the rotational freedom degree at the attachment side to the vehicle body 55 not to rotate in the vehicle width direction, protrusion of the rotary linkage mechanism to the outside of the vehicle can be made smaller. Therefore, there is an effect of reducing damage of the rotary linkage mechanism 301 caused by contact with an obstacle during vehicle running. As a result, the protective cover 43 can be made thinner in the vehicle width direction.

Now, the rotary linkage mechanism 30 of Embodiment 4 shown in FIG. 13 is compared with the rotary linkage mechanism 301 of Embodiment 5 shown in FIG. 15.

Regarding the rotary linkage mechanism 30 of Embodiment 4 shown in FIG. 13, with respect to movement in the left-and-right direction of the wheel, the whole of the linkage mechanism rotates in the vehicle width direction by using the rotating joint 35 with three freedom degrees as a fulcrum. Therefore, it is necessary to set the thickness in the vehicle width direction of the protective cover 43 so that it may include not only a height of the part but also a moving range of the rotary linkage mechanism. Therefore, compared with the rotary linkage mechanism 301 of FIG. 15 whose freedom degree at the attachment side to the vehicle body 55 is two degrees of freedom, when the rotary linkage mechanism 30 of FIG. 13 is used, the protective cover 43 will be somewhat thick.

On the other hand, since each of the rotating joints 33 and 35 of the rotary linkage mechanism 301 according to Embodiment 5 is configured by two pin hinges, it is necessary to prepare rotating joints at five positions, and the number of parts is large. Therefore, the reliability of the rotating joint part is lower compared with the rotary linkage mechanism 30 shown in FIG. 13. Moreover, since the increase of the number of parts also indicates increase of quantity of the rotary linkage mechanism itself, the closer to the vehicle attachment side the rotating joint is, the stronger it needs to be.

Embodiment 6

In this Embodiment 6, with reference to FIG. 16, there will be described a structure example of a rotary linkage mechanism 302 having five degrees of rotational freedom, where degrees of rotational freedom are selected respectively to be one degree for the first rotating joint 34, two degrees for the second rotating joint 33, and two degrees for the third rotating joint 35.

In addition, the structure and the operation of the rotary linkage mechanism 302 are the same as those of the rotary linkage mechanism 30 described in Embodiment 4 except for the point of having different degrees of rotational freedom of the first and the third rotating joints 34 and 35. Moreover, description of the structure of the vehicle speed detection unit 1 using the rotary linkage mechanism 302 is omitted because it has basically the same structure as that of the rotary linkage mechanism 301 shown in FIG. 15 described in Embodiment 5.

FIG. 16 typically shows a structure of the rotary linkage mechanism 302 according to Embodiment 6. In the figure, the symbol denoting the rotating joint is based on the Industrial robots Graphical symbols of mechanism (JISB0138).

In FIG. 16, the rotary linkage mechanism 302 is configured by rotating joints, where each of the first rotating joint 34 and the third rotating joint 35 is configured by two pin hinges to have two degrees of rotational freedom, and the second rotating joint 33 is the same as that in FIG. 13. The protective cover 43 covers and protects a part at the end of the first link 31, and all of the second link 32, the first rotating joint 34 and the third rotating joint 35.

Moreover, in the state shown in FIG. 16, the second rotating joint 33 can rotate about one axis of the up-and-down axis, the first rotating joint 34 can rotate about two axes of the front-and-back axis and the right-and-left axis, and the third rotating joint 35 can rotate about two axes of the up-and-down axis and the right-and-left axis, respectively.

The rotary linkage mechanism 302 according to Embodiment 6 shown in FIG. 16, as well as the rotary linkage mechanism 301 according to Embodiment 5 shown in FIG. 15, can follow vibration in the up and down direction that is the largest in the vibration of the vehicle 50 by mainly just moving the first link 31, thereby narrowing the movement range of the second link 32. In addition, since it is possible to set the rotational freedom degree at the attachment side to the vehicle body 55 not to rotate in the vehicle width direction, protrusion of the rotary linkage mechanism to the outside of the vehicle can be made smaller. Therefore, there is an effect of reducing damage of the rotary linkage mechanism 302 caused by contact with an obstacle during vehicle running. As a result, the protective cover 43 can be made thinner in the vehicle width direction.

Furthermore, compared with the rotary linkage mechanism 301 of Embodiment 5 shown in FIG. 15, since most of all the movable parts of the rotating joints except for one rotating joint can be arranged in the protective cover, it has a feature of excellent environment resistance.

On the other hand, since each of the first and the third rotating joints 34 and 35 of the rotary linkage mechanism 302 of Embodiment 6 shown in FIG. 16 is configured by two pin hinges, it is necessary to prepare rotating joints at five positions, and the number of parts is large. Therefore, the reliability of the rotating joint part is lower compared with the rotary linkage mechanism 30 shown in FIG. 13. Moreover, since the increase of the number of parts also indicates increase of quantity of the rotary linkage mechanism itself, the closer to the vehicle attachment side the rotating joint is, the stronger it needs to be.

Embodiment 7

In this Embodiment 7, with reference to FIG. 17, there will be described a structure example of a rotary linkage mechanism 303 having five degrees of rotational freedom, where degrees of rotational freedom are selected respectively to be two degrees for the first rotating joint 34, two degrees for the second rotating joint 33, and one degree for the third rotating joint 35.

In addition, the structure and the operation of the rotary linkage mechanism 303 are the same as those of the rotary linkage mechanism 30 described in Embodiment 4 except for the point of having different degrees of rotational freedom of the first, the second and the third rotating joints 34, 33 and 35. Moreover, description of the structure of the vehicle speed detection unit 1 using the rotary linkage mechanism 303 is omitted because it has basically the same structure as that of the rotary linkage mechanism 301 shown in FIG. 15 described in Embodiment 5.

FIG. 17 typically shows a structure of the rotary linkage mechanism 303 according to Embodiment 7. In the figure, the symbol denoting the rotating joint is based on the Industrial robots Graphical symbols of mechanism (JISB0138).

In FIG. 17, the rotary linkage mechanism 303 is configured by rotating joints, where each of the second rotating joint 33 and the first rotating joint 34 is formed by two pin hinges to have two degrees of rotational freedom, and configured by the third rotating joint 35 formed by one pin hinge to have one degree of rotational freedom. The protective cover 43 covers and protects a part at the end of the first link 31, and all of the second link 32, the first rotating joint 34 and the third rotating joint 35.

Moreover, in the state shown in FIG. 17, the second rotating joint 33 can rotate about two axes of the front-and-back axis and the up-and-down axis, the first rotating joint 34 can rotate about two axes of the right-and-left axis and the up-and-down axis, and the third rotating joint 35 can rotate about one axis of the right-and-left axis, respectively.

The rotary linkage mechanism 303 according to Embodiment 7 shown in FIG. 17, as well as the rotary linkage mechanism 301 according to Embodiment 5 shown in FIG. 15, can follow vibration in the up and down direction that is the largest in the vibration of the vehicle 50 by mainly just moving the first link 31, thereby narrowing the movement range of the second link 32. In addition, since it is possible to set the rotational freedom degree at the attachment side to the vehicle body 55 not to rotate in the vehicle width direction, protrusion of the rotary linkage mechanism to the outside of the vehicle can be made smaller. Therefore, there is an effect of reducing damage of the rotary linkage mechanism 303 caused by contact with an obstacle during vehicle running. As a result, the protective cover 43 can be made thinner in the vehicle width direction.

On the other hand, since each of the first and the second rotating joints 34 and 33 of the rotary linkage mechanism 303 of Embodiment 7 shown in FIG. 17 is configured by two pin hinges, it is necessary to prepare rotating joints at totally five positions, and the number of parts is large. Therefore, the reliability of the rotating joint part is lower compared with the rotary linkage mechanism 30 shown in FIG. 13. Moreover, since the increase of the number of parts also indicates increase of quantity of the rotary linkage mechanism itself, the closer to the vehicle attachment side the rotating joint is, the stronger it needs to be.

Embodiment 8

In this Embodiment 8, with reference to FIG. 18, there will be described a structure example of a rotary linkage mechanism 304 having five degrees of rotational freedom, where degrees of rotational freedom are selected respectively to be three degrees for the first rotating joint 34, one degree for the second rotating joint 33, and one degree for the third rotating joint 35.

In addition, the structure and the operation of the rotary linkage mechanism 304 are the same as those of the rotary linkage mechanism 30 described in Embodiment 4 except for the point of having different degrees of rotational freedom of the first, the second and the third rotating joints 34, 33 and 35. Description of the structure of the vehicle speed detection unit 1 using the rotary linkage mechanism 302 is omitted.

FIG. 18 typically shows a structure of the rotary linkage mechanism 304 according to Embodiment 8. In the figure, the symbol denoting the rotating joint is based on the Industrial robots Graphical symbols of mechanism (JISB0138).

In FIG. 18, the rotary linkage mechanism 304 is configured by the first rotating joint 34 and the third rotating joint 35, each of which is formed by one pin hinge to have one degree of rotational freedom, and configured by the second rotating joint 33 formed by a ball joint to have three degrees of rotational freedom. The protective cover 43 covers and protects a part at the end of the first link 31, and all of the second link 32, the first rotating joint 34 and the third rotating joint 35.

Moreover, in the state shown in FIG. 18, the second rotating joint 33 can rotate about three axes of the right-and-left axis, the front-and-back axis and the up-and-down axis, the first rotating joint 34 can rotate about one axis of the right-and-left axis, and the third rotating joint 35 can rotate about one axis of the front-and-back axis, respectively.

The rotary linkage mechanism 304 according to Embodiment 8 shown in FIG. 18, as well as the rotary linkage mechanism 30 according to Embodiment 4 shown in FIG. 13, can follow vibration in the up and down direction that is the largest in the vibration of the vehicle 50 by mainly just moving the first link 31, thereby narrowing the movement range of the second link 32. Moreover, the protective cover 43 can be made thinner in the vehicle width direction.

However, since the second rotating joint 33 of the rotary linkage mechanism 304 according to Embodiment 8 shown in FIG. 18 is a ball joint with three degrees of rotational freedom, the rotary encoder 21 freely rotates using this rotating joint as a fulcrum. As a result, the ball joint part rotates up and down under the influence of its self weight, to give a measurement error factor to the rotary encoder 21. For this reason, since the measurement precision and reliability are lower compared with the rotary linkage mechanism described in each of Embodiments 4 to 8, it is preferable to use according to required precision.

The vehicle speed detection unit 1 according to the above Embodiment includes the rotary encoder 21 whose rotating shaft 25 rotating with respect to the stator is connected to the wheel of the vehicle 50, and the rotary linkage mechanism, attached to the body of the vehicle 50, for rotatably holding the stator of the rotary encoder 21, with five degrees of rotational freedom.

Moreover, it includes the rotary encoder 21 whose rotating shaft 25 rotating with respect to the stator is connected to the wheel of the vehicle 50, the holding tool for holding the stator of the rotary encoder 21, the first and second links 31 and 32 which are rotatably connected with having the first rotating joint 34, the vehicle attachment 4 which is attached and fixed, diagonally upward of the axle of the wheel, to the periphery of the fender of the vehicle body of the vehicle 50, and the second and third rotating joints 33 and 35 which hold the first and second links 31 and 32 therebetween and connect the ends of the first and second links 31 and 32 to the holding tool and the vehicle attachment 4 respectively, wherein the degree of rotational freedom of the first, second, and third rotating joints 34, 33, and 35 is totally five degrees of rotational freedom.

Thus, in the vehicle speed detection unit 1 according to Embodiment described above, by configuring the vehicle speed detection unit 1 by the rotary linkage mechanism with five degrees of rotational freedom, it becomes possible to thin the components of the vehicle speed detection unit 1 and reduce deformation and damage of the vehicle speed detection unit 1 caused by contact with an obstacle or a feature on the road and its surroundings, thereby increasing the durability.

REFERENCE SIGNS LIST

Figure 1:
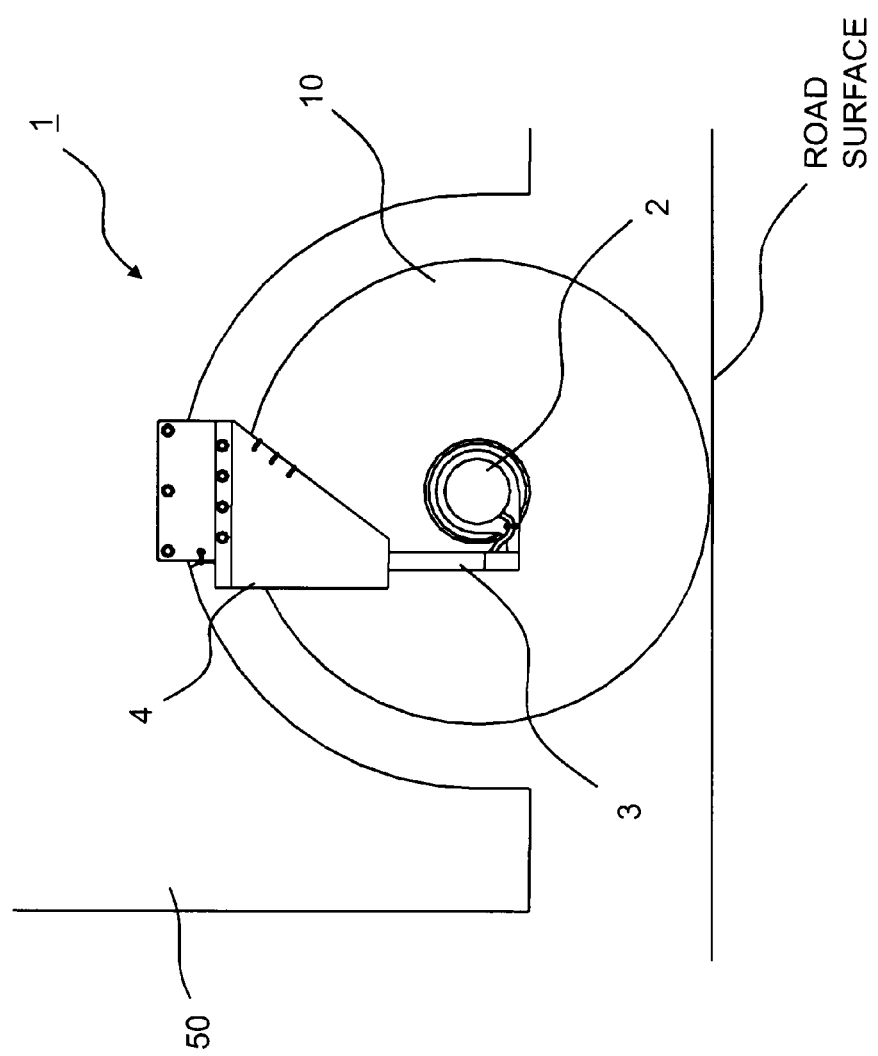
FIG. 1 depicts a state in which a vehicle speed detection unit 1 according to Embodiment 1 is mounted on a vehicle 50.
Figure 2:
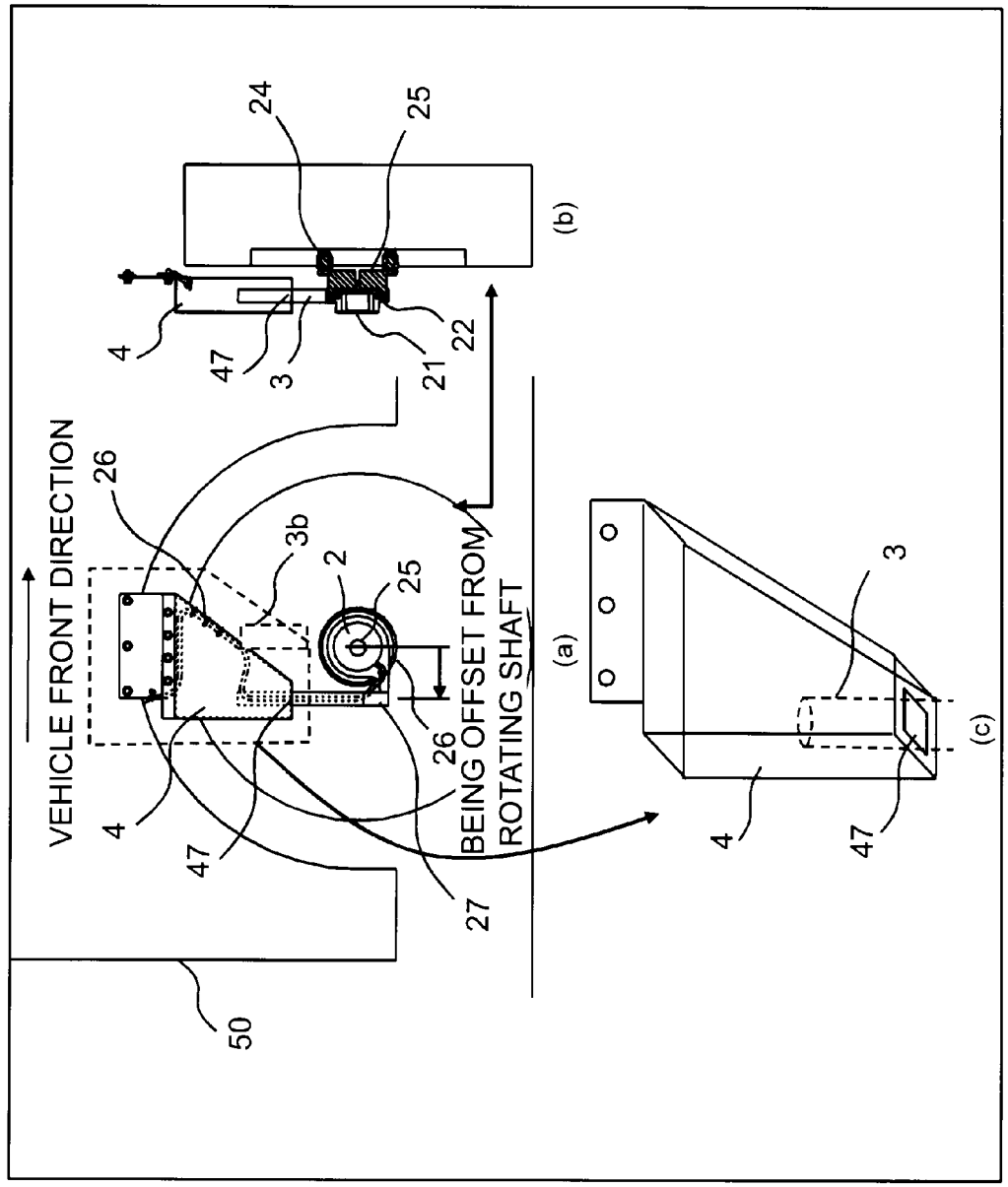
FIG. 2 shows a configuration diagram of the vehicle speed detection unit 1 according to Embodiment 1.
Figure 3:
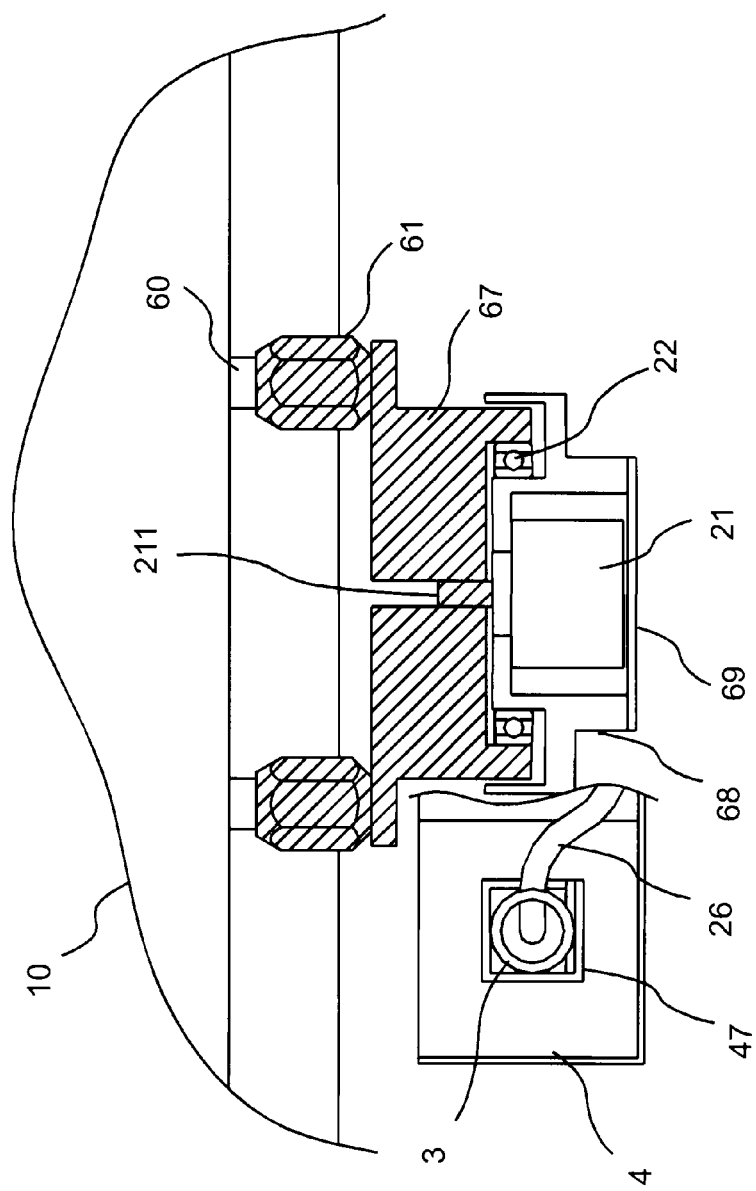
FIG. 3 is a cross sectional view of the periphery of a rotary encoder of the vehicle speed detection unit 1 according to Embodiment 1.
Figure 4:
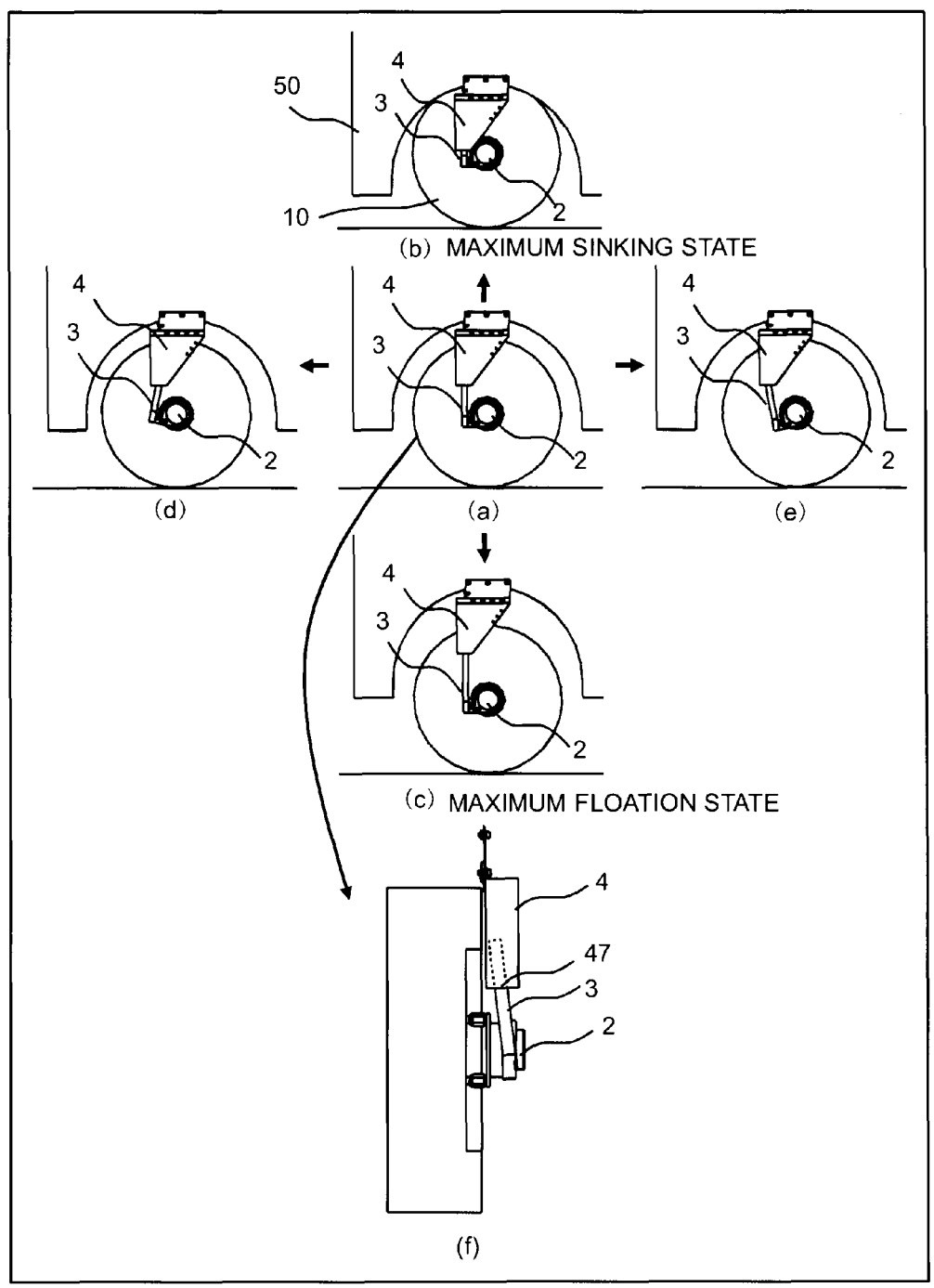
FIG. 4 shows motion of a shaft 3 during vehicle running, according to Embodiment 1.
Figure 5:
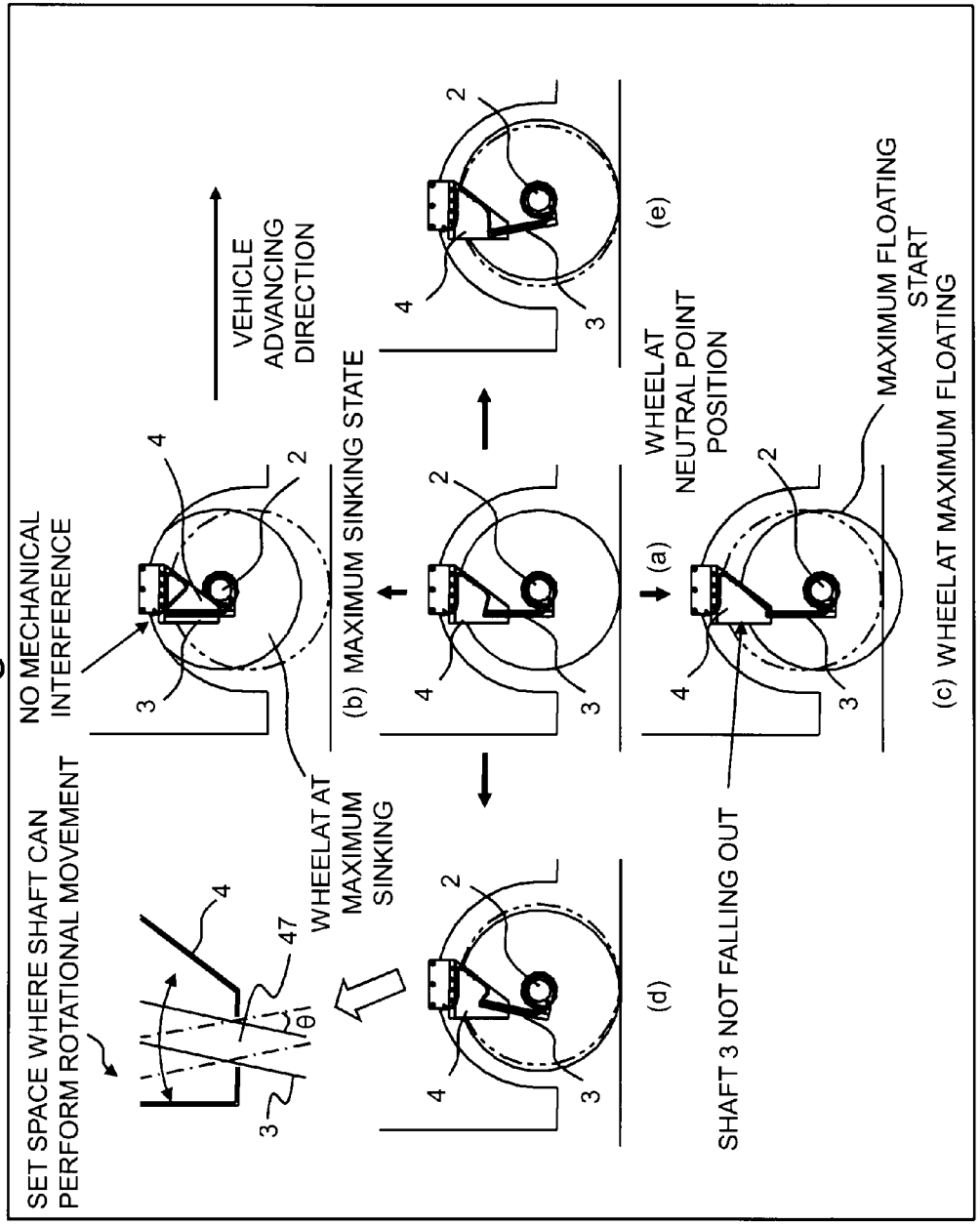
FIG. 5 shows motion of the shaft 3 during vehicle running, according to Embodiment 1.
Figure 6:
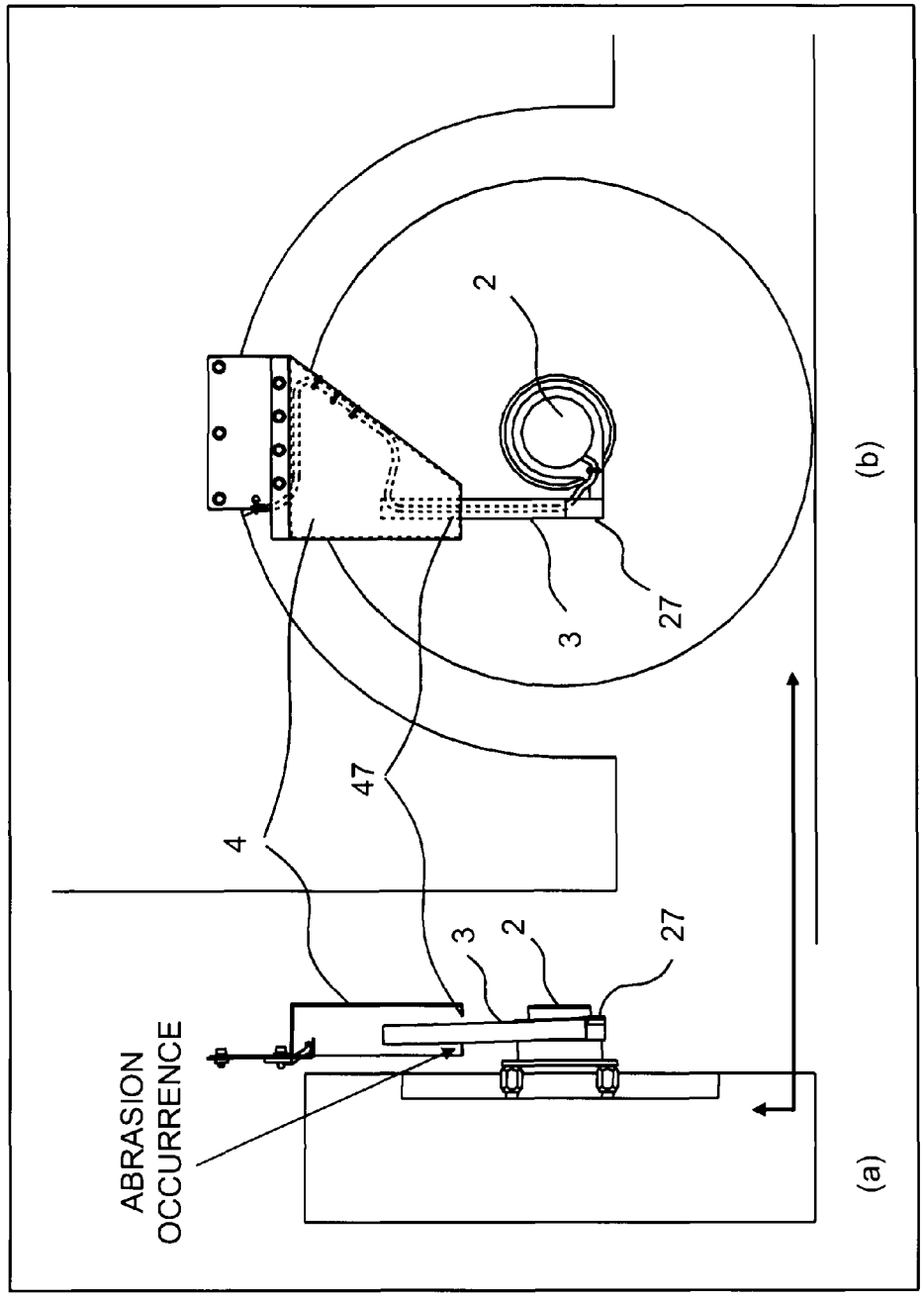
FIG. 6 shows a sectional view of the vehicle speed detection unit 1 in a state where the shaft 3 passes through a hole of a bracket 4 according to Embodiment 1.
Figure 7:
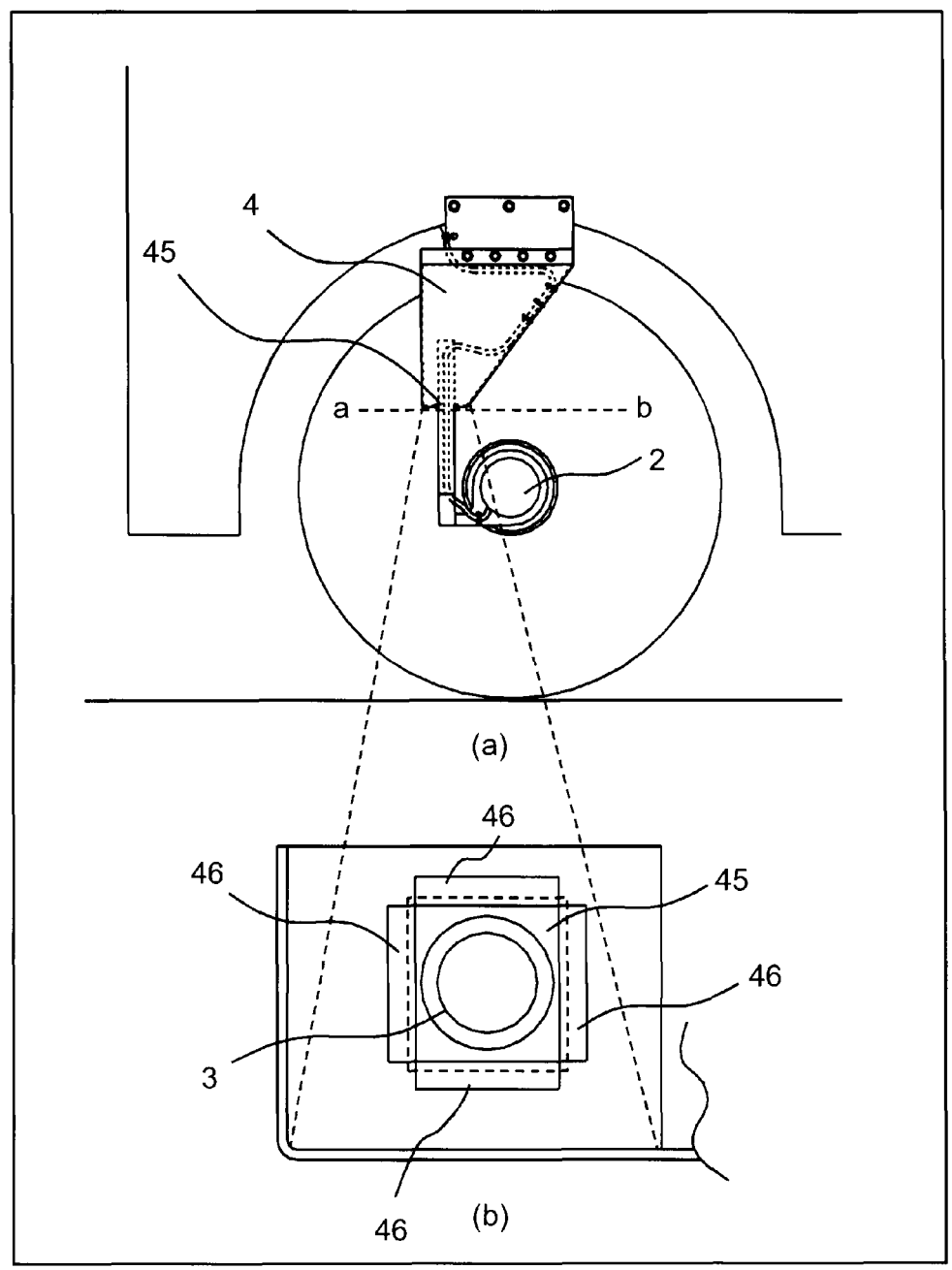
FIG. 7 shows a structure of the vehicle speed detection unit 1 according to Embodiment 2.
Figure 8:
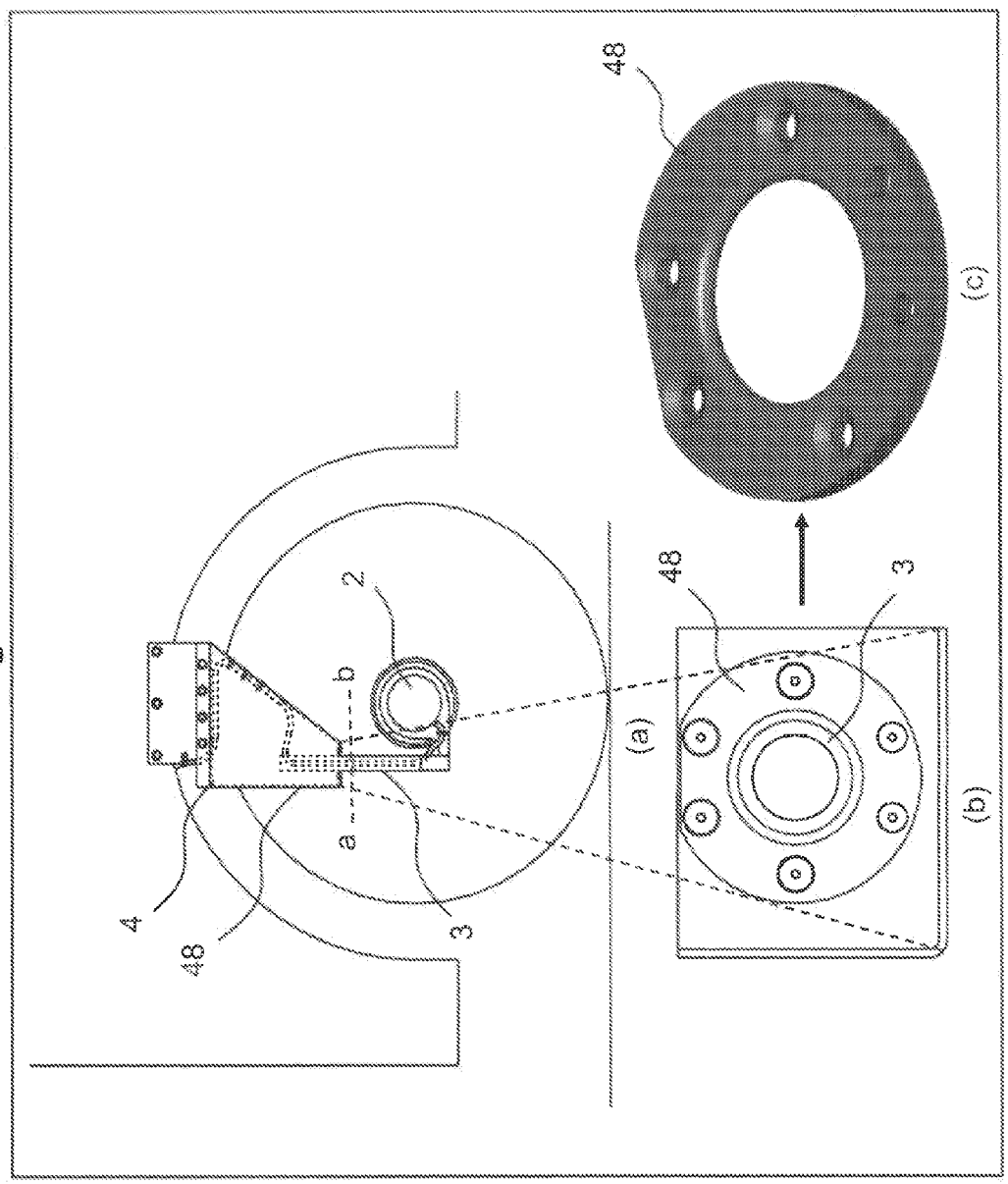
FIG. 8 shows a structure of the vehicle speed detection unit 1 according to Embodiment 3.
Figure 9:
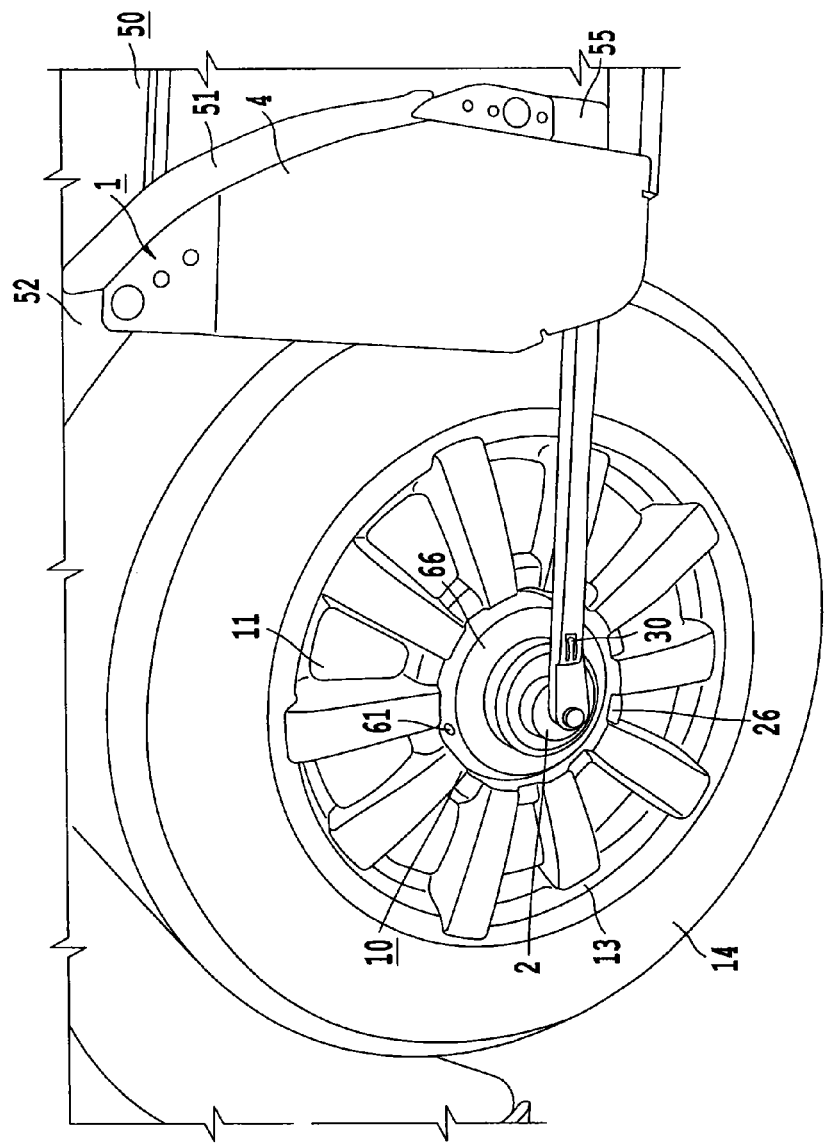
FIG. 9 shows a state where the vehicle speed detection unit 1 of Embodiment 4 according to the present invention is externally attached to a vehicle 50.
Figure 10:
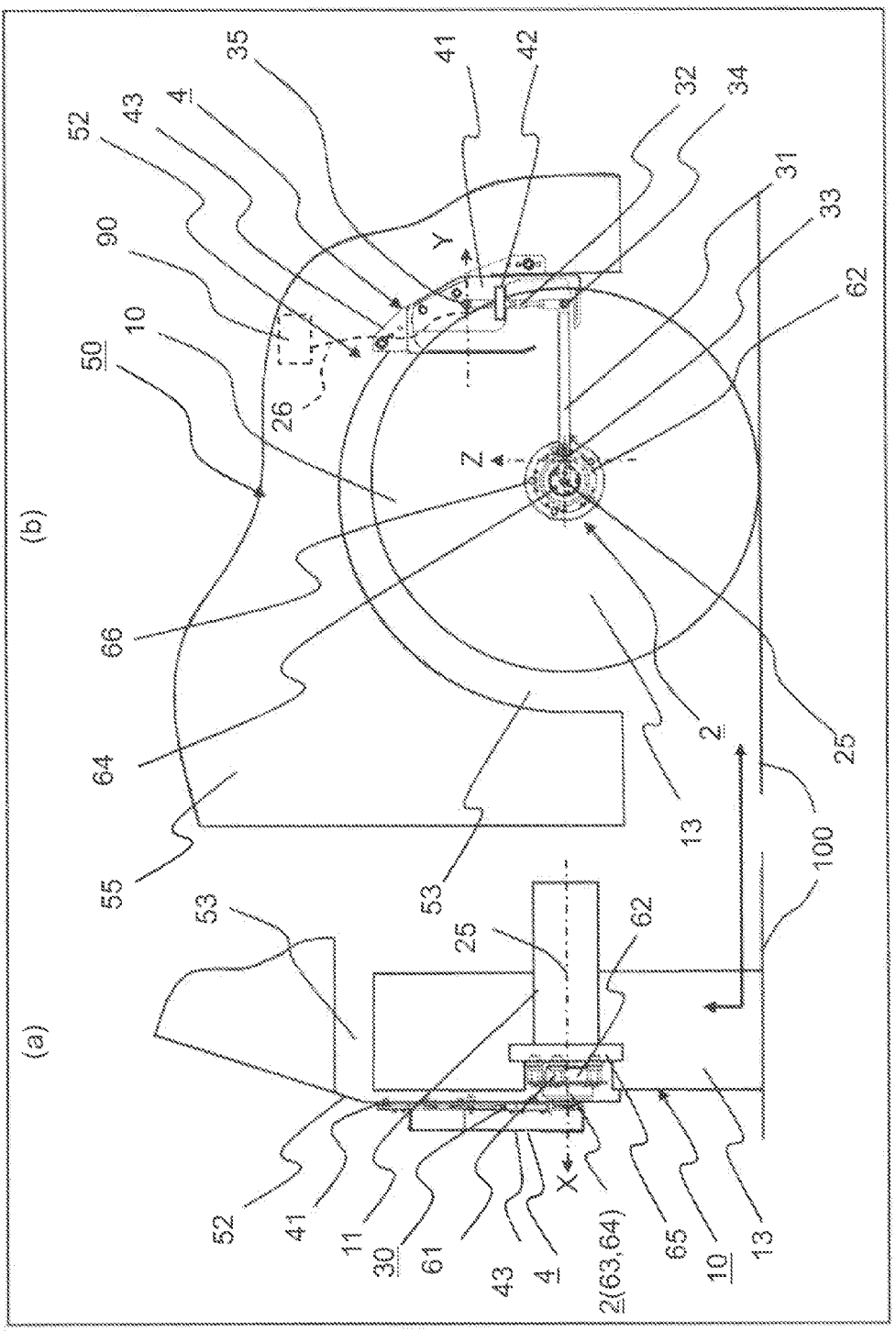
FIG. 10 shows a structure of the vehicle speed detection unit 1 of Embodiment 4 according to the present invention.
Figure 11:
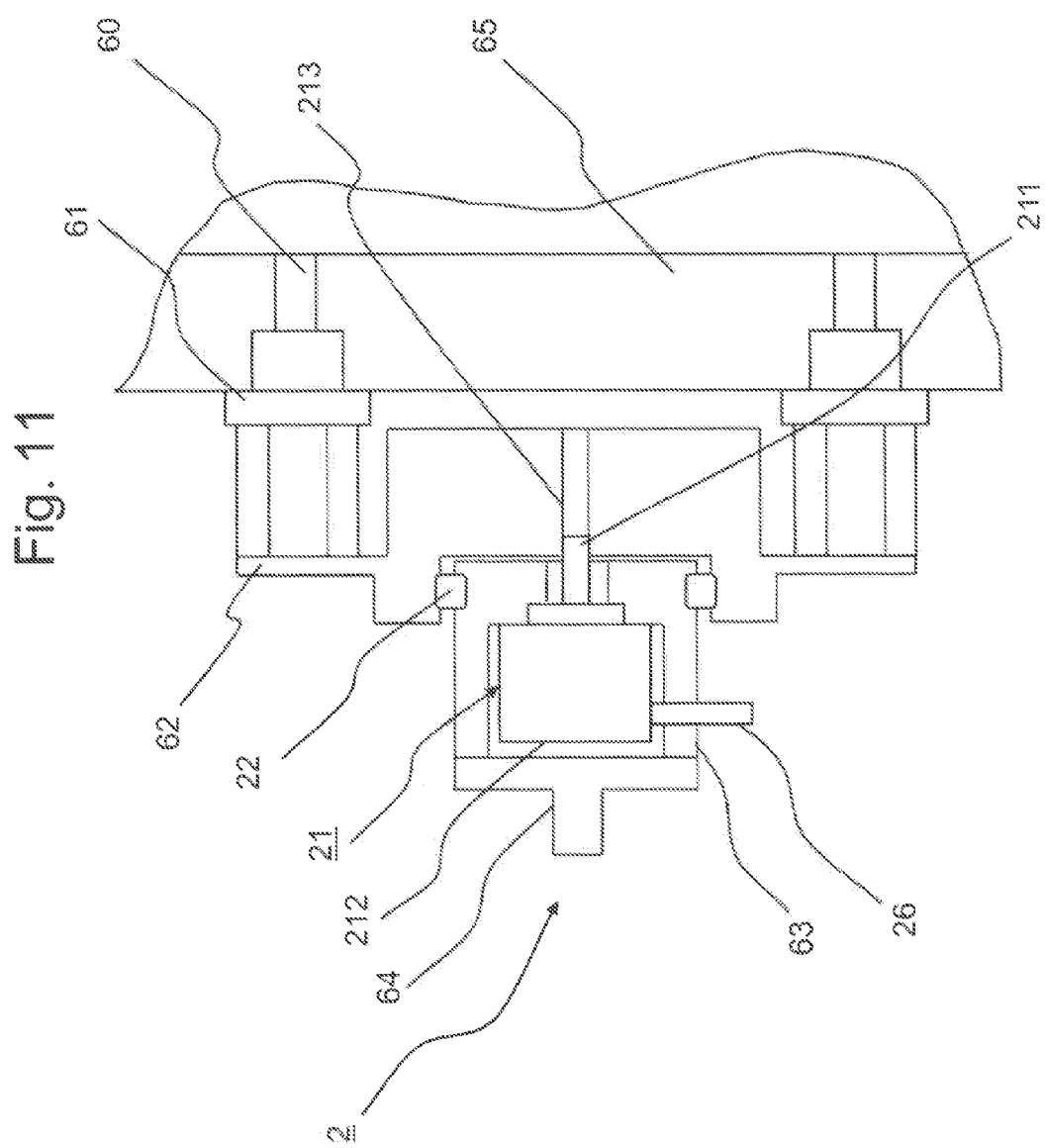
FIG. 11 is a sectional view showing a structure of a vehicle speed detecting part 2 of Embodiment 4 according to the present invention.
Figure 12:
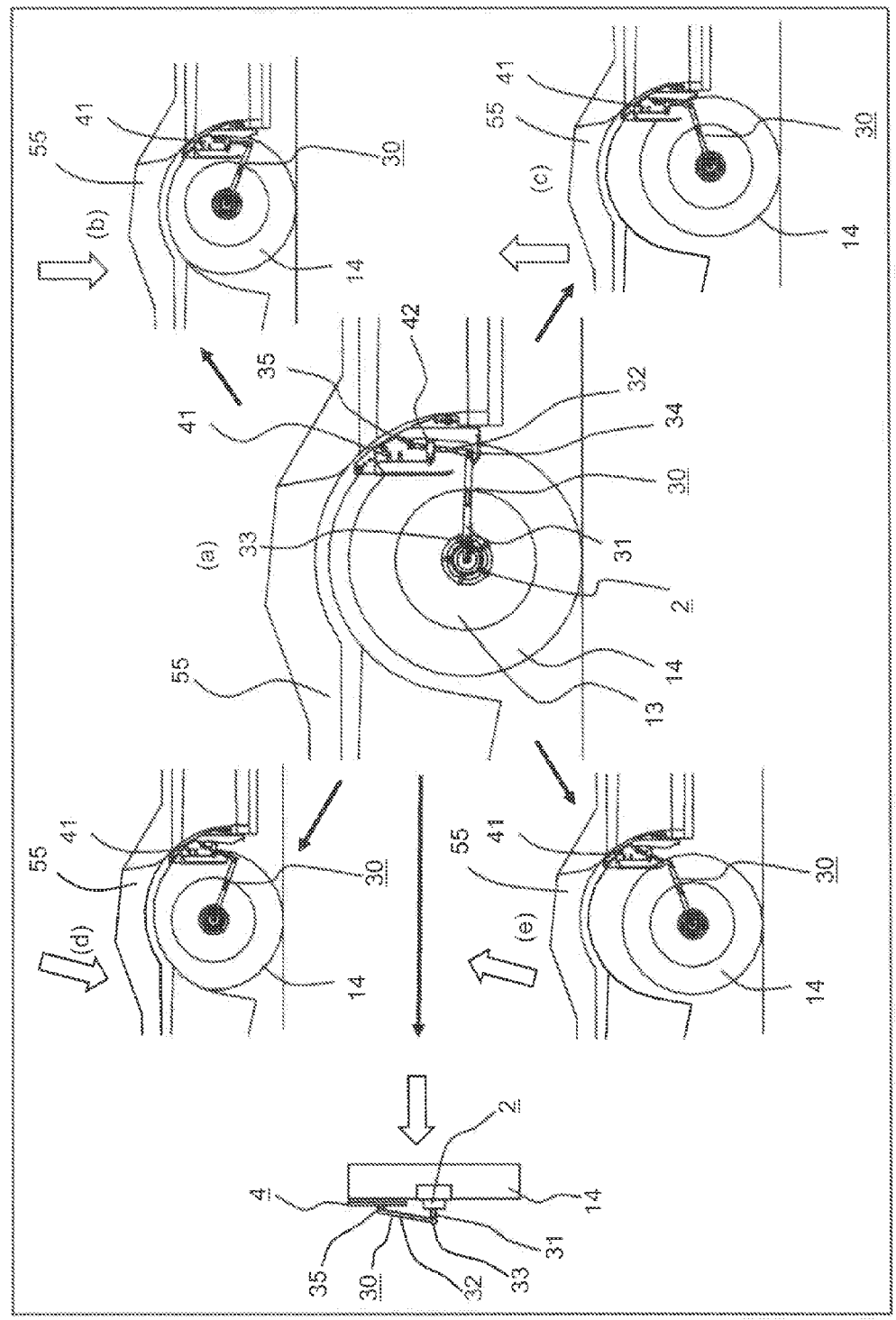
FIG. 12 shows actions of a rotary linkage mechanism 30 during vehicle running described in Embodiment 4 according to the present invention.
Figure 13:
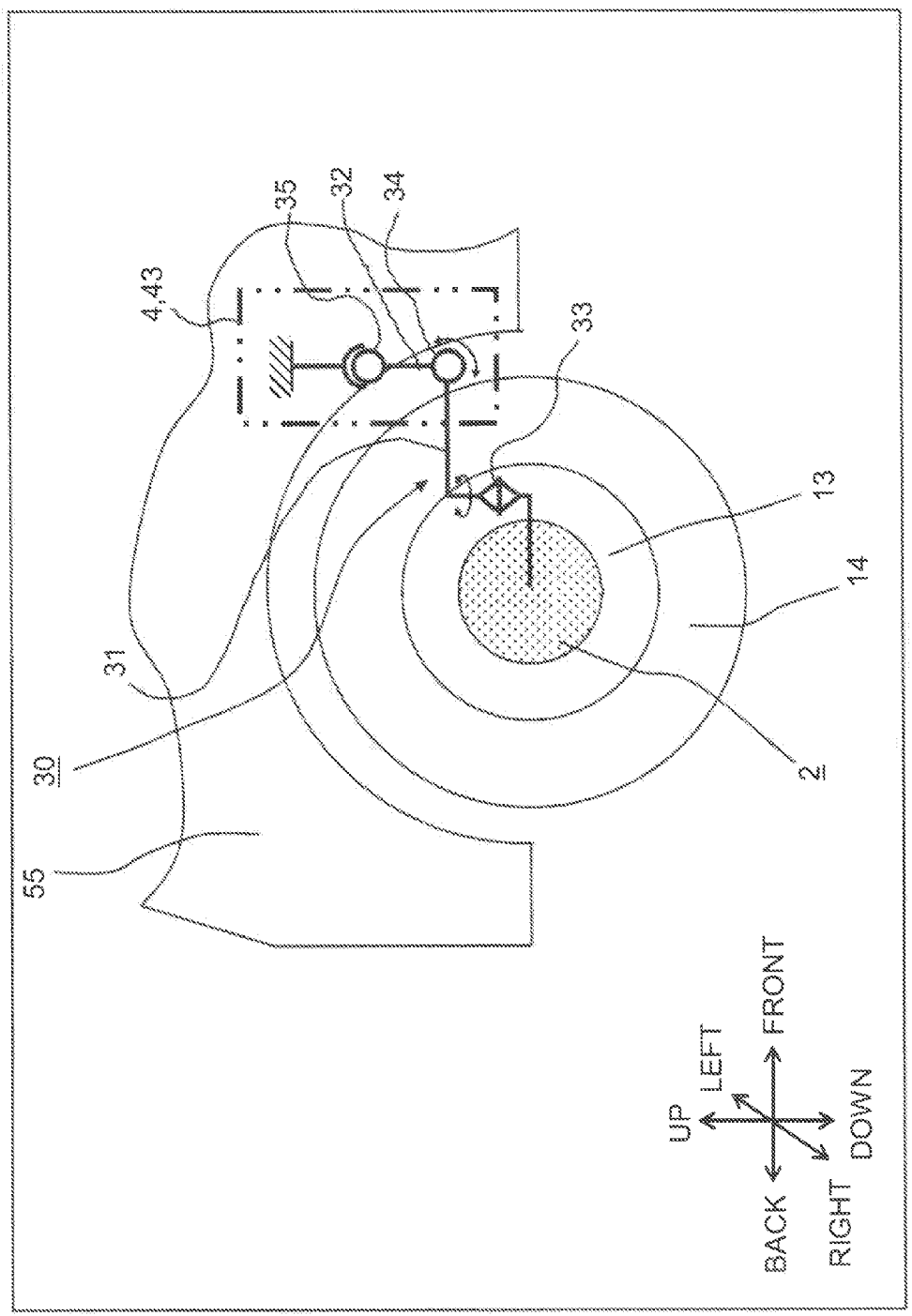
FIG. 13 typically shows a structure of the rotary linkage mechanism 30 of Embodiment 4 according to the present invention.
Figure 14:
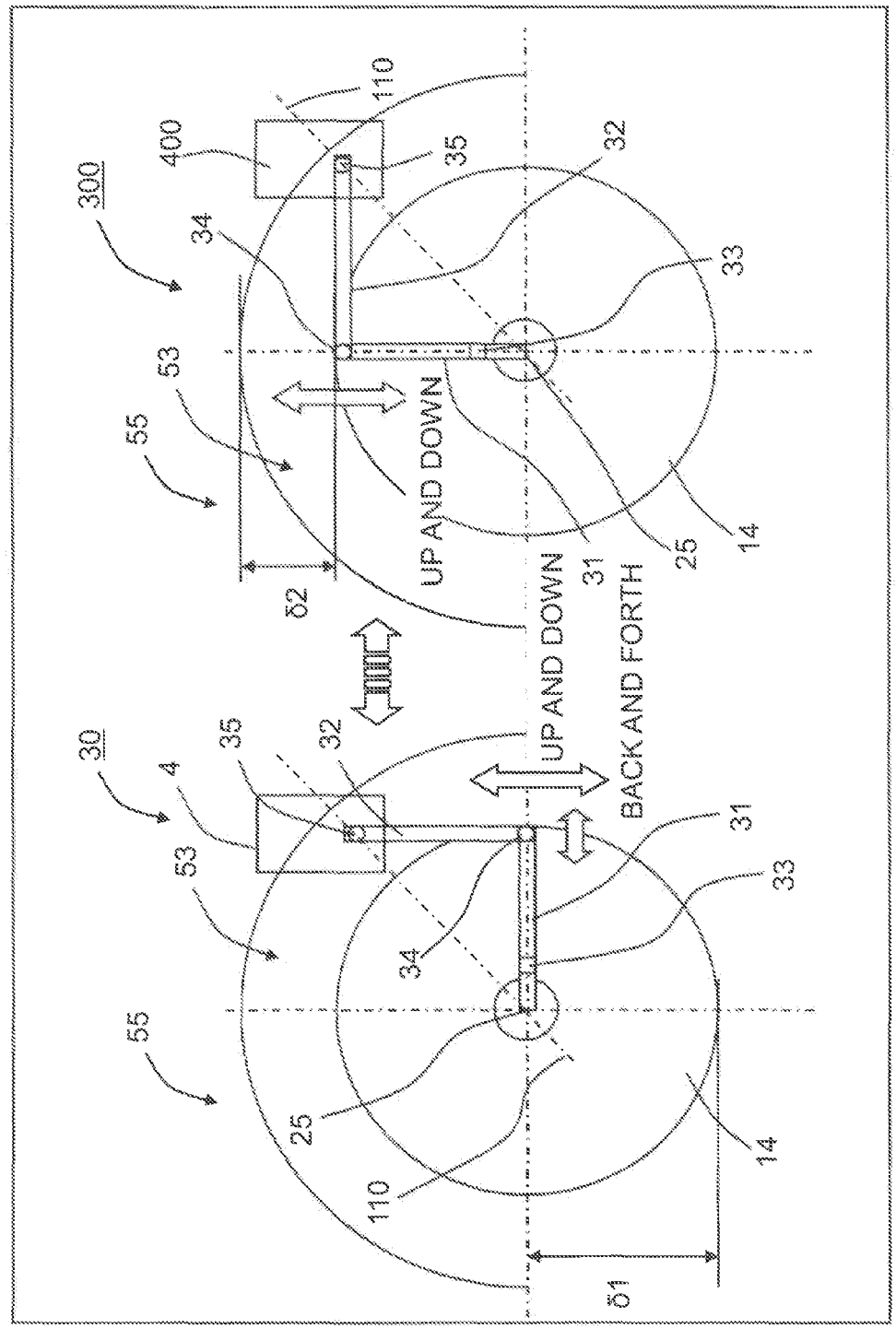
FIG. 14 shows a contrast between a link configuration of the rotary linkage mechanism 30 of Embodiment 4 according to the present invention and another link configuration.
Figure 15:
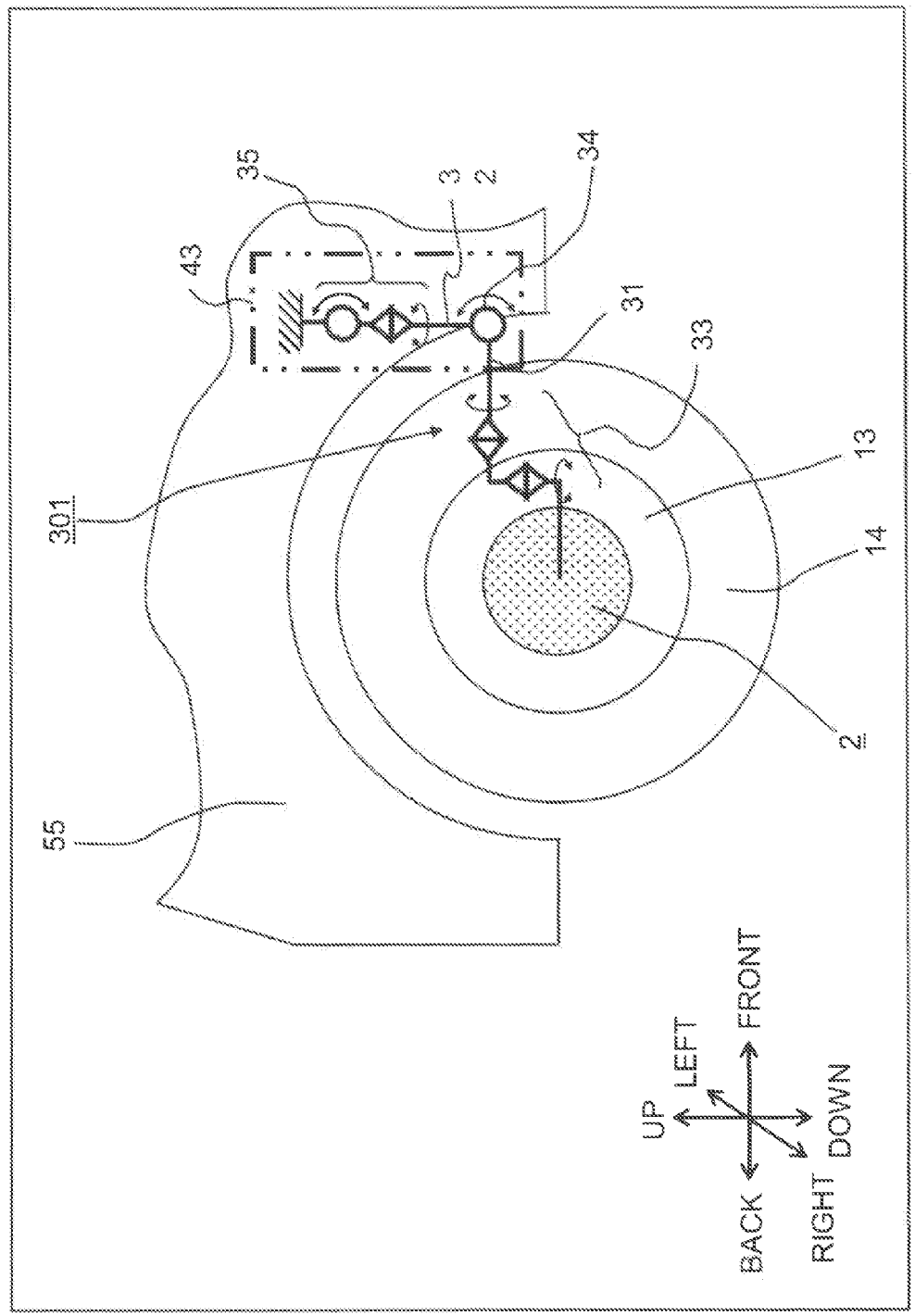
FIG. 15 typically shows a structure of a rotary linkage mechanism 301 of Embodiment 5 according to the present invention.
Figure 16:
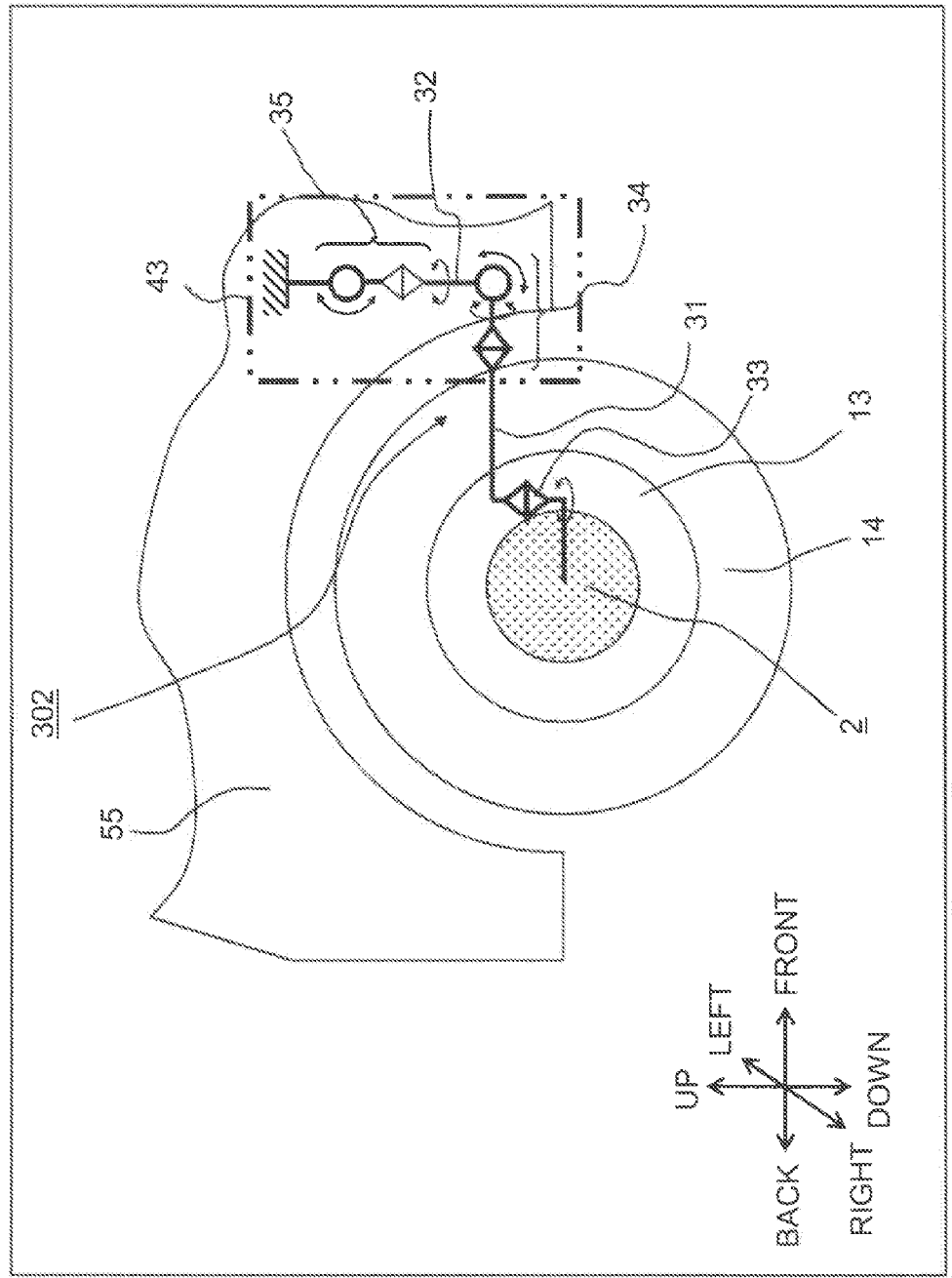
FIG. 16 typically shows a structure of a rotary linkage mechanism 302 of Embodiment 6 according to the present invention.
Figure 17:
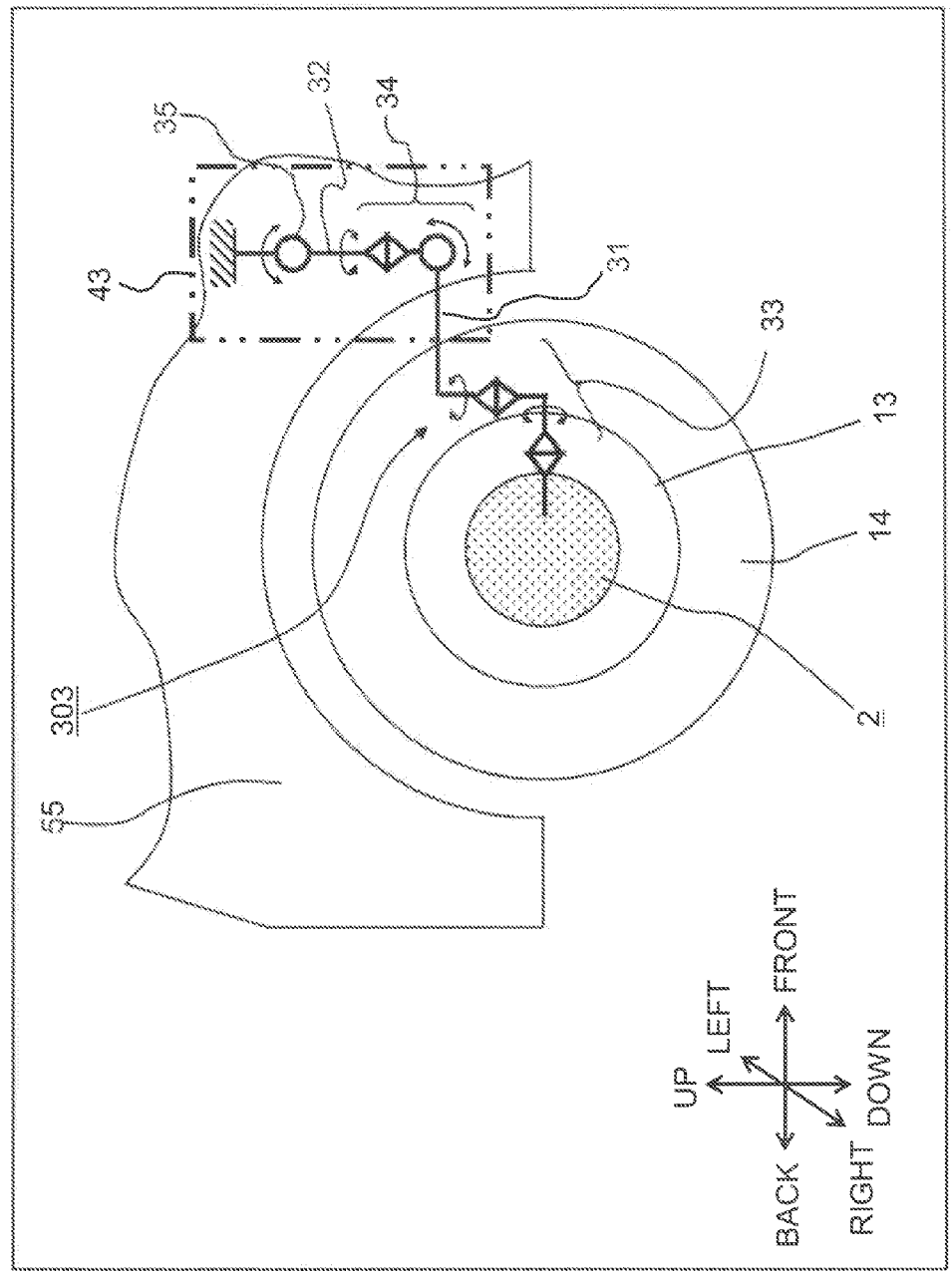
FIG. 17 typically shows a structure of a rotary linkage mechanism 303 of Embodiment 7 according to the present invention.
Figure 18:
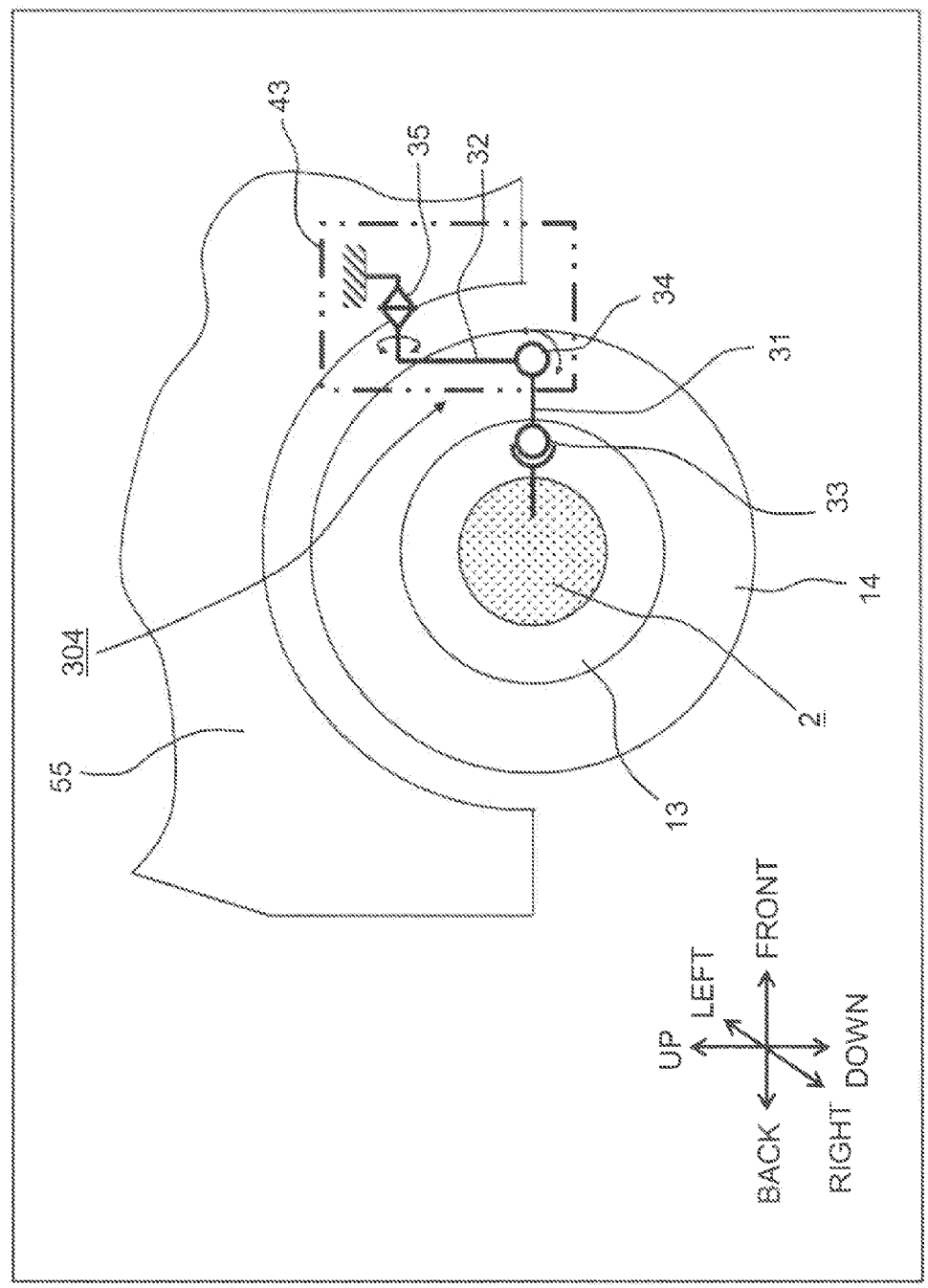
FIG. 18 typically shows a structure of a rotary linkage mechanism 304 of Embodiment 8 according to the present invention.
Figure 19:
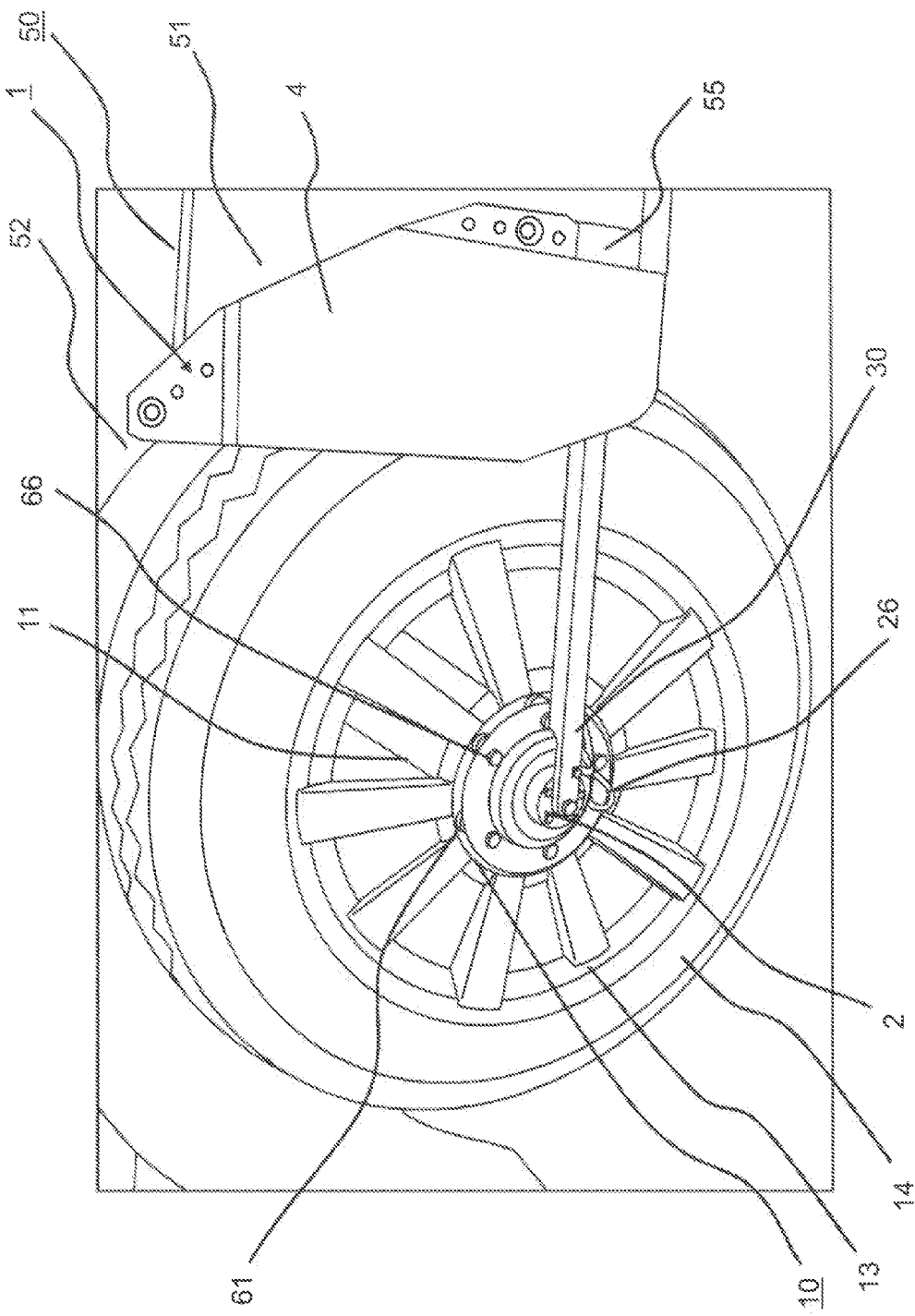
FIG. 19 shows a state where the vehicle speed detection unit 1 of Embodiment 4 according to the present invention is externally attached to the vehicle 50.

1 Vehicle speed detection unit, 2 Vehicle speed detecting part, 3 Shaft, 4 Bracket, 10 Wheel, 11 Axle, 13 Wheel-body, 14 Tire, 21 Rotary Encoder, 22 Bearing, 24 Vehicle part, 25 Rotating shaft, 26 Signal output cable, 27 Elastic body, 30 Rotary linkage mechanism, 31 First link, 32 Second link, 33 Second rotating joint, 34 First rotating joint, 35 Third rotating joint, 41 Bracket (Attaching stationary plate), 42 Guide, 43 Protective cover, 45 Hole, 46 Protection bush, 47 Hole, 48 Shaft holding component, 50 Vehicle, 51 Over fender, 52 Fender, 53 Wheel house, 55 Vehicle body, 60 Wheel stud, 61 Wheel nut, 62 Attachment hub, 63 Holder (Holding tool), 64 Holding bracket (Attachment), 65 Axle hub, 66 Fixing bolt, 67 Processed part (Inner), 68 Processed part (Outer), 69 Cover, 90 Signal processing unit, 100 Road surface, 211 Rotor (rotating shaft of a rotary encoder), 212 Stator (main body of a rotary encoder), 213 Shaft coupling, 300 Rotary linkage mechanism, 301 Rotary linkage mechanism, 302 Rotary linkage mechanism, 303 Rotary linkage mechanism, 304 Rotary linkage mechanism.

The invention claimed is:
1. A wheel attachment unit comprising:
a rotary encoder whose rotating shaft is connected to a wheel of a vehicle; and
a rotary linkage mechanism, attached to a body of the vehicle, for rotatably holding the rotary encoder, with five degrees of rotational freedom, wherein the rotating shaft of the rotary encoder, which rotates with respect to a stator, is connected to the wheel of the vehicle, the wheel attachment unit further comprises a holding tool for holding the stator of the rotary encoder, and a vehicle attachment to be attached and fixed, diagonally upward of an axle of the wheel, to a fender periphery of the body of the vehicle, wherein the rotary linkage mechanism includes a first link and a second link which are rotatably connected at a first rotating joint, and includes a second rotating joint and a third rotating joint, holding the first link and the second link therebetween, for respectively connecting ends of the first link and the second link to the holding tool and the vehicle attachment, and wherein degree of rotational freedom of the first rotating joint, the second rotating joint, and the third rotating joint is totally five degrees of rotational freedom.

2. The wheel attachment unit according to claim 1, wherein the vehicle attachment includes an attaching stationary plate hanging down from a lower part of an over fender of the vehicle, and attached to the fender periphery of the vehicle, diagonally upward of the axle of the wheel, a cover attached to the attaching stationary plate, to cover the attaching stationary plate and the second link, and a guide protrudingly provided between the cover and the attaching stationary plate, to have a space against the attaching stationary plate, and contactlessly enclosing a part of the second link, with the attaching stationary plate.

3. The wheel attachment unit according to claim 1, wherein the first link has a space for storing a signal output cable of the rotary encoder.

* * * * *